US012432677B2

(12) United States Patent
Sun et al.

(10) Patent No.: US 12,432,677 B2
(45) Date of Patent: Sep. 30, 2025

(54) ENHANCED MACHINE TYPE COMMUNICATIONS (MTC) FOR NON-TERRESTRIAL NETWORKS (NTN)

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Hong He, San Jose, CA (US); Huaning Niu, San Jose, CA (US); Weidong Yang, Beijing (CN); Oghenekome Oteri, San Diego, CA (US); Sigen Ye, San Diego, CA (US); Chunhai Yao, Beijing (CN); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/765,463

(22) PCT Filed: Apr. 2, 2021

(86) PCT No.: PCT/CN2021/085406
§ 371 (c)(1),
(2) Date: Mar. 31, 2022

(87) PCT Pub. No.: WO2022/205458
PCT Pub. Date: Oct. 6, 2022

(65) Prior Publication Data
US 2024/0057002 A1 Feb. 15, 2024

(51) Int. Cl.
*H04W 56/00* (2009.01)
*H04W 72/12* (2023.01)
(Continued)

(52) U.S. Cl.
CPC ....... *H04W 56/0045* (2013.01); *H04W 72/12* (2013.01); *H04W 72/232* (2023.01); *H04W 84/16* (2013.01)

(58) Field of Classification Search
CPC ............. H04W 56/0045; H04W 72/12; H04W 72/232; H04W 84/16; H04B 7/18504; H04B 7/1851
See application file for complete search history.

(56) References Cited

U.S. PATENT DOCUMENTS

2022/0039033 A1* 2/2022 Sengupta ............. H04B 7/1851
2022/0053487 A1* 2/2022 Sengupta ............. H04L 5/0092
(Continued)

FOREIGN PATENT DOCUMENTS

CN 110621078 A 12/2019
CN 112153733 A 12/2020
(Continued)

OTHER PUBLICATIONS

3rd Generation Partnership Project; Technical Specification Group Radio Access Network; NR; Multiplexing and channel coding (Release 16); 3GPP TS 38.212 V16.5.0 (Mar. 2021); http://www.3gpp.org.
(Continued)

*Primary Examiner* — Chae S Lee
(74) *Attorney, Agent, or Firm* — Eschweiler & Potashnik LLC; Matthew Glause

(57) ABSTRACT

Apparatus and methods are provided to enhance communications for NTN. In some aspects, a base station (BS) comprises a processor configured to schedule an uplink transmission in response to an uplink transmission request from a user equipment (UE) using one or more subframes ranging from a first uplink subframe to a last uplink subframe. The processor is further configured to determine or receive a timing advance (TA) indicating amount of subframes transmitted during a time delay between the UE and the BS and schedule a downlink transmission aligned with the uplink transmission. The downlink transmission is blocked from subframes ranging from TA plus one or more
(Continued)

subframes ahead of the first uplink subframe to TA minus one or more subframes ahead of the last uplink subframe. The processor is further configured to transmit and receive, via a non-terrestrial equipment, the uplink and the downlink.

20 Claims, 10 Drawing Sheets

(51) Int. Cl.
*H04W 72/232* (2023.01)
*H04W 84/16* (2009.01)

(56) References Cited

U.S. PATENT DOCUMENTS

| 2022/0053531 | A1* | 2/2022 | Sengupta | H04L 5/0053 |
| 2022/0086780 | A1* | 3/2022 | Tsai | G01S 19/05 |
| 2024/0064677 | A1* | 2/2024 | Yan | H04W 56/0035 |
| 2024/0155527 | A1* | 5/2024 | Medles | H04W 72/231 |

FOREIGN PATENT DOCUMENTS

| EP | 2408243 | A1 * | 1/2012 | H04J 3/0682 |
| WO | 2018127208 | A1 | 7/2018 | |
| WO | 2020031155 | A1 | 2/2020 | |

OTHER PUBLICATIONS

3rd Generation Partnership Project; Technical Specification Group Radio Access Network; NR; Physical layer procedures for control (Release 16); 3GPP TS 38.213 V16.5.0 (Mar. 2021); http://www.3gpp.org.

PCT Search Report dated Dec. 23, 2021 in connection with PCT Application No. PCT/CN2021/085406.

PCT Written Opinion dated Dec. 28, 2021 in connection with PCT Application No. PCT/CN2021/085406.

"HTC Clarification of Timing Advance adjustment delay requirements"; 3GPP TSG-RAN WG2; Meeting #77bis; R2-121564; Mar. 30, 2012(Mar. 30, 2012).

Huawei et al. Considerations on timing advance design in NR; 3GPP TSG RAN WG1 NR; Ad Hoc Meeting; R1-1710005; Jun. 30, 2017(Jun. 30, 2017).

3rd Generation Partnership Project; Technical Specification Group Radio Access Network; Solutions for NR to support non-terrestrial networks (NTN) (Release 16); 3GPP TR 38.821 V1.1.0 Dec. 2019, (Dec. 2019).

LTE; Evolved Universal Terrestrial Radio Access (E-UTRA); Physical channels and modulation; (3GPP TS 36.211 version 16.4.0 Release 16); ETSI TS 136 211 V16.4.0 Feb. 2021, (Feb. 2021).

International Preliminary Report on Patentability dated Oct. 3, 2023 in connection with PCT Application No. PCT/CN2021/085406.

* cited by examiner

ENHANCED MACHINE TYPE COMMUNICATIONS (MTC) FOR NON-TERRESTRIAL NETWORKS (NTN)

This application is a National Phase entry application of International Patent Application No. PCT/CN2021/085406 filed Apr. 2, 2021, entitled "ENHANCED MACHINE TYPE COMMUNICATIONS (MTC) FOR NON-TERRESTRIAL NETWORKS (NTN)", the contents of which are herein incorporated by reference in their entirety.

FIELD

The present disclosure relates to non-terrestrial networks (NTNs) including to enhance machine type communications (MTC) for NTN.

BACKGROUND

Some wireless communication networks, such as non-terrestrial networks may be susceptible to high-latency links, which complicates many aspects of communication.

BRIEF DESCRIPTION OF THE DRAWINGS

Some examples of apparatuses and/or methods will be described in the following by way of example only. In this context, reference will be made to the accompanying figures.

DETAILED DESCRIPTION

Figure 1:
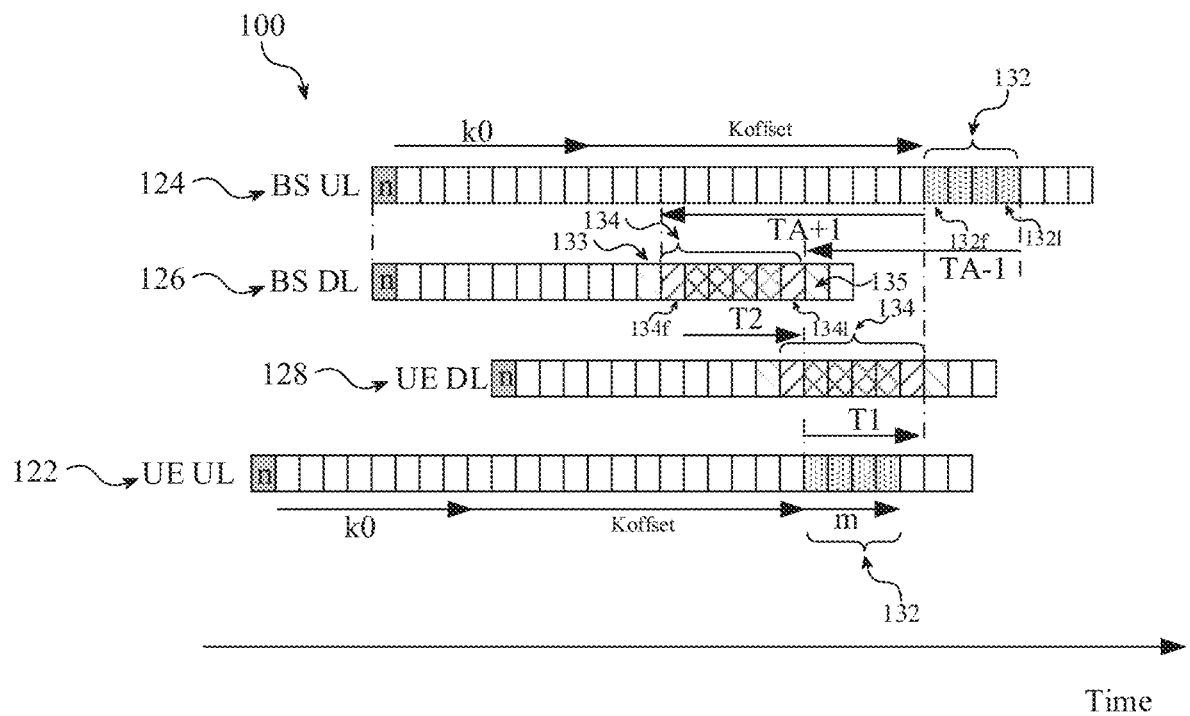
FIG. 1 is a timing diagram showing an exemplary sub-frame allocation during base station uplink-downlink scheduling in accordance with some aspects.

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Wireless communication networks, enabling voice and data communications to mobile devices, continue to advance in various aspects such as technological sophistication, system capacity, data rates, bandwidth, supported services, and the like. A basic model of one type of wireless networks, generally known as "cellular," features a plurality of fixed network nodes (known variously as base station, radio base station, base transceiver station, serving node, NodeB, eNodeB, eNB, gNodeB, gNB and the like, and hereafter referred as base station or BS), each providing wireless communication service to a large plurality of mobile devices (known variously as mobile terminals, user equipment and the like, and hereafter referred as user equipment or UE) within a generally fixed geographical area, known as a cell or sector.

One development of wireless communication is towards machine type communications (MTC) providing limited bandwidth and low data rate service to simple and/or cheap devices with very low power budgets. For example, in Release 13, the Third Generation Partnership Project (3GPP) standardized two different approaches of this kind: enhanced MTC (eMTC) and narrowband Internet of Things (NB-IoT). The latter more aggressively addresses the extremely low cost market with less than 200 KHZ of spectrum. Both eMTC and NB-IoT are optimized for lower complexity/power, deeper coverage, and higher device density, while seamlessly coexisting with regular mobile broadband.

Meanwhile, the focus on non-terrestrial networks (NTN) is growing. NTN refer to networks, or segments of networks, using an airborne or spaceborne vehicle for transmission. NTN enables delivering services in areas lacking network infrastructure or availability like during natural disasters. Satellite links can provide coverage for isolated or moving platforms such as aircrafts, ships, oil platforms, and trains, and support MTC communications discussed above. Mobile operators can also use satellite links to cover the edge of their networks. Customers may connect through both terrestrial and satellite links, the terrestrial links handling low-latency traffic and the satellite ones carrying high-latency traffic. In one deployment scenario of NTN, a satellite referred to as a transparent satellite may act as a relay station to link UEs with a ground-based BS and the core network by implementing a transparent payload. In another deployment scenario, a satellite referred to as a regenerative satellite may have onboard processing capability to perform the functions of a BS by implementing a regenerative payload between UEs and the ground-based core network. Though the term "satellite" is used for non-terrestrial equipment of the NTN hereafter, examples of other non-terrestrial equipment include aerial vehicles, A2G (air to ground) system, HAPS (high altitude platform station, such as airplane, helicopter, drones, etc.), and the like.

This disclosure focuses on supporting MTC communications over NTN in the long-term evolution (LTE) networks, systems, and standards, but aspects can expand to the new radio (NR) mobile network and other future telecommunication generations when applicable.

Due to the wide coverage area of the satellites and the long distances between the satellites and the UEs on the ground, propagation time delay and frequency shift become a more serious issue than communications within the terrestrial network. To support MTC over NTN as part of cellular networks, various techniques are disclosed herein to adjust scheduling timing and enhance uplink and downlink transmission via a non-terrestrial equipment and between BS and UE.

Techniques Related to Downlink Scheduling Restrictions for Half-Duplex Frequency Division Duplex (HD-FDD) Operation HD-FDD operation uses two separate frequency bands for uplink and downlink transmissions, but the uplink and downlink transmissions are non-overlapping in time. The advantages of HD-FDD operation, as viewed from an operational standpoint of the base station, include allowing multiple UEs to time-share uplink and downlink resources. Accordingly, half-duplex FDD operation can be implemented on FDD networks for managing large groups of asymmetric data requirements, in a manner similar to time divided (e.g., TDD) system.

Compared to full-duplex FDD, HD-FDD only needs a relatively simple switch for transmit/receive separation rather than a FDD duplex filter. During a scheduling operation of the base station, sub-frames are assigned to a UE for uplink and downlink transmissions such that the UE is not transmitting and receiving in the same subframe. In some cases, there are additional guard period created to protect the UE from interferences between uplink and downlink transmissions. For example, in LTE, a first type of HD-FDD operation requires a guard period for the UE not to receive the last part of a downlink subframe immediately preceding an uplink subframe from the UE. A second type of HD-FDD operation requires a guard period for the UE not to receive a downlink subframe immediately preceding a first uplink subframe of the same UE and immediately following a second uplink subframe from the same UE. For narrowband Internet of things (NB-IoT), only the second type of HD-FDD operation is supported according to 3GPP TS 36.211 10.2.2.3.

When scheduling HD-FDD for MTC over NTN, existing timing definitions involving uplink-downlink timing may not hold when there is a large offset in UE's uplink-downlink frame timing in NTN. In order to compensate a large propagation between a satellite BS and a UE or between a terrestrial BS and a UE via a satellite, a timing advance (TA) adjustment is implemented and enhanced for scheduling downlink transmission subframes. The TA adjustment corresponds to a time length of a round trip delay (RTD) from a first time the UE transmits uplink signals to the BS/network via a non-terrestrial equipment to a second time the UE receives downlink signals from the BS/network via the non-terrestrial equipment. In some aspects, the TA includes a service link propagation delay and a feeder link propagation delay. The service link propagation delay is UE specific and is measured by the UE based on UE's location and satellite's location. The feeder link propagation delay may be broadcasted and received by the UE. The TA may be expressed as an amount of subframes or slots transmitted during a period of time delay. For example, when a subframe is 1 ms, a time delay of 10 ms corresponds to a TA of 10 subframes. In some aspects, the TA indicates the amount of subframes transmitted during a time delay between the UE and a reference point. The reference point can be defined as the point where the timing alignment of uplink and downlink frames can be observed. The reference point may be set at servicing satellite, at base station, or anywhere in the service link (i.e. UE to satellite link), or anywhere in the feeder link (i.e., satellite to base station link). Thus, when BS schedules aligned uplink and downlink subframes for a UE, downlink transmission should be prohibited from being scheduled for subframes ranging from TA+1 (TA subframes plus one subframe) ahead of the first uplink subframe to TA−1 (TA subframes minus one subframe) ahead of the last uplink subframe. As a result of the scheduling, when scheduled downlink arrives UE, subframes ranging from one subframe immediately preceding the first uplink subframe to one subframe immediately following the last uplink subframe would be blocked to prevent uplink-downlink interference.

In some aspects, the uplink and/or the downlink transmission is scheduled by a DCI (downlink control information). The DCI indicates a time gap k0 between DCI and the NPDSCH. Also, a time offset Koffset is indicated via SIB or RRC signaling, and the uplink and/or the downlink transmission is allocated to Koffset subframes following the last subframe of NPDCCH (narrowband physical downlink control channel). As an example, the value of Koffset may be in a range of 0, 1, 2, . . . , 32. In some aspect, the time offset Koffset is equal to TA or two times propagation delay (i.e., round-trip propagation delay). In other aspects, the time offset Koffset is larger than TA. In some aspects, the TA and Koffset are used jointly by the UE. For example, while Koffset may be used to determine which UL subframe for its uplink transmission, TA is used to determine when to send a UL subframe.

In some aspects, the uplink is NPUSCH format 1 (narrowband physical uplink shared channel) or NPUSCH format 2, and/or the downlink is NPDSCH (narrowband physical uplink shared channel).

FIG. 1 illustrates a timing diagram 100 showing uplink-downlink subframe patterns as an example of a downlink scheduling restriction during a BS uplink-downlink scheduling process. Patterns 122, 124, 126, and 128 are shown along a relative time line to show uplink-downlink scheduling and transmission between a BS and a specific UE.

As shown by the pattern 122, a UE transmit an uplink 132 to a BS. In some aspects, the uplink 132 is a NPUSCH signal scheduled by the BS after receiving an uplink transmission request from the UE. The scheduling may be transmitted to the UE by a DCI. The uplink 132 may be allocated to subframes range from n+k0+Koffset to n+k0+Koffset+m, where n is the last subframe of DCI format NO, k0 is the time gap between DCI and the NPDSCH, Koffset is the time offset introduced to enhance uplink-downlink transmission timing over NTN, and m is the length of the uplink 132. In the example of FIG. 1, k0 is 8 subframes, Koffset is 14 subframes, and m is 4 subframes.

As shown by the pattern 124, the uplink 132 arrives the BS after a first propagation time T1. As shown by the pattern 126, a guard period 134 is allocated when the BS schedules a downlink transmission to the UE. In some aspects, the downlink scheduling is aligned with the scheduling of the uplink 132 shown by the pattern 124. A timing advance (TA) specific to the UE is adopted to calculate the guard period 134. In some aspects, TA may include the first propagation time T1 transmitting an uplink from the UE to the BS/network and a second propagation time T2 transmitting a downlink from the BS/network to the UE. In some aspects, the guard period 134 is allocated that the downlink is prohibited between a first subframe 134*f* locating at n+k0+Koffset−TA−1 and a last subframe 134*l* locating at n+k0+Koffset+m−TA+1. In some further aspects, the guard period 134 is extended to some more neighboring subframes to further enhance guarding effect. The guard period 134 may be allocated to prohibit downlink between subframes n+Koffset−TA−e and n+Koffset+m−TA+e, where e is a value of 1, 2, 3, . . . , that represents an extended subframe amount that is prohibited by downlink scheduling. A list of e values may be pre-defined and selected during downlink scheduling. More details will be discussed below regarding when and how to acquire TA by the BS. For example, when e is selected as 1, the pattern 126 shows the guard period 134 may be expanded to a subframe 133 as one subframe more than TA+1 ahead of the first uplink subframe 132*f* of the uplink 132 to a subframe 135 as one subframe less than TA−1 ahead of the last uplink subframe 132*l* of the uplink 132.

As shown by the pattern 128, when the downlink scheduled as shown by the pattern 126 arrives the UE after the second propagation time T2, subframes ranging from one subframe immediately preceding the uplink 132 (referring to the pattern 122) to one subframe immediately following the uplink 132 would be blocked. For some further aspects not shown in FIG. 1, more than one subframes immediately preceding the uplink 132 and more than one subframes immediately following the uplink 132 may be blocked. Thereby, the implementation of downlink guard period 134 during the BS uplink-downlink scheduling prevents subframe interference of downlink and uplink at the UE.

Figure 2:
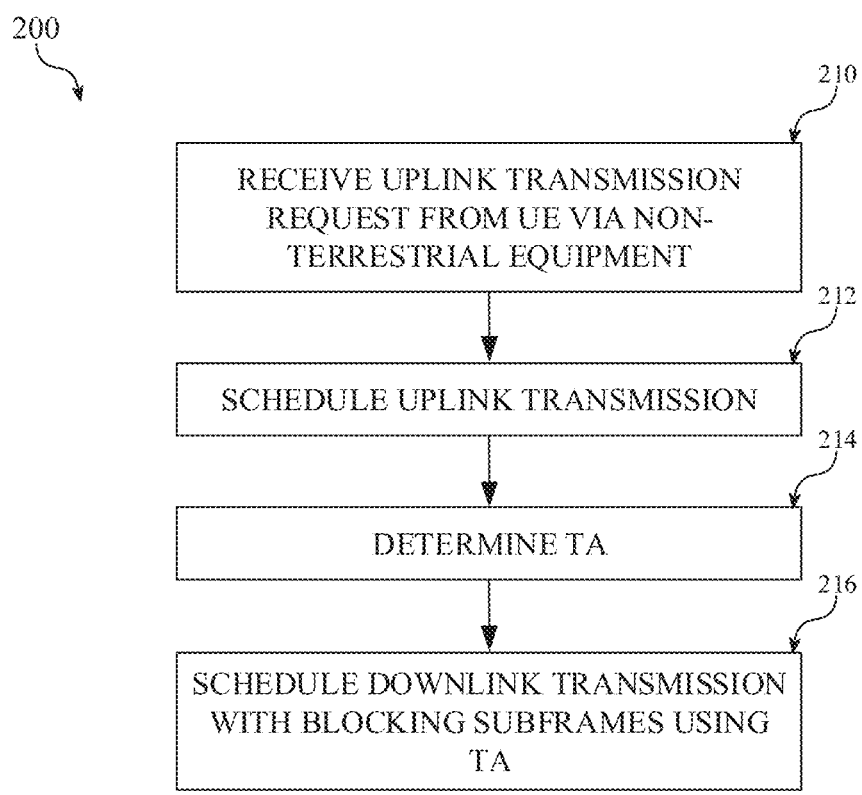
FIG. 2 is a flow diagram of an exemplary method for base station uplink-downlink scheduling in accordance with some aspects.

FIG. 2 illustrates a flow diagram 200 of an exemplary method for a BS uplink-downlink scheduling in accordance with some aspects. The method may be executed as operations of one or more processors of an apparatus that can be employed in a BS. The method may also be executed as instructions on a machine or computer circuitry, where the instructions are included on at least one computer readable medium or one non-transitory machine readable storage medium.

At act 210, the BS receives, via a non-terrestrial equipment, an uplink transmission request from a UE. As an example, the uplink transmission request may be transmitted to the BS through a RA (random access) process using NPRACH (narrow physical random access channel) or through a UCI (uplink control information) carried by NPUSCH.

At act 212, the BS schedules an uplink transmission in response to the uplink transmission request. The uplink transmission may be allocated to one or more subframes ranging from a first uplink subframe to a last uplink subframe. For example, the first uplink subframe can be n+K'offset, and the last uplink subframe can be n+K'offset+m, where n is the last subframe of DCI format N0 or the last subframe of a NPDCCH signal, K'offset is based on the numerology of the uplink transmission, and m is the length of the uplink transmission.

Figure 3:
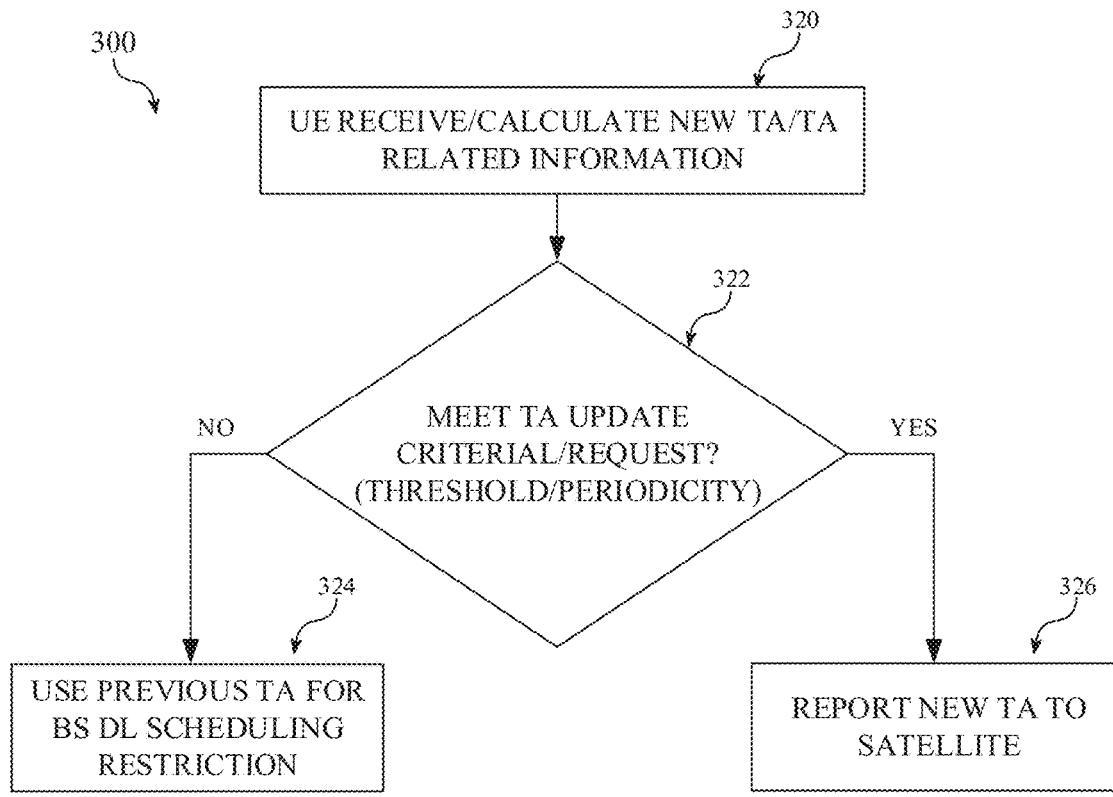
FIG. 3 is a flow diagram of an exemplary method to reduce TA report signaling overhead in accordance with some aspects.

At act 214, a TA is determined. The TA represents amount of subframes transmitted during a time delay between the UE and the BS/network. In some aspects, TA is based on UE's self-estimation of service link. In some aspects, the TA is acquired by calculating a distance between UE and satellite using UE's location such as UE's global navigation satellite system (GNSS) location and satellite's location such as satellite's ephemeris. In some aspects, the UE location is reported to the BS by the UE and is not updated unless changed. The TA may also not be updated if its change is less than a threshold. In some aspects, unless an updating criterial is met, the TA is estimated from previously stored TA and TA drift rate, which may be received from the UE. More details of some aspects about TA updating are discussed below associated with FIG. 3, but FIG. 3 is not limited to HD-FDD communication. In some aspects, TA also includes a common time delay of a feeder link.

At act 216, the BS schedules a downlink transmission aligned with the uplink transmission. In some aspects, when the BS schedules the downlink transmission, it is blocked from subframes ranging from TA plus one or more subframes ahead of the first uplink subframe to TA minus one or more subframes ahead of the last uplink subframe. For the above example, the downlink transmission may not be scheduled between subframes n+Koffset−TA−e and n+Koffset+m−TA+e, where e is a value of 1, 2, 3, . . . , that represents an extended subframe amount that is prohibited by downlink scheduling. A list of e values may be pre-defined and selected during downlink scheduling. Accordingly, by acquiring UE specific TA and restricting certain subframes during BS downlink scheduling calculated using the acquired UE specific UE, downlink-uplink subframe interference is prevented for HD-FDD communication for MTC over NTN.

Schemes to Reduce TA Report Signaling Overhead

From above, a UE specific TA needs to be known by a BS to determine scheduling restriction for downlink transmission. For NTN, satellite is moving, and relative distance between UE and satellite could change largely. Thus, the UE specific TA keeps changing and is unknown to the BS. A UE needs to report its TA or TA related information to the BS frequently which uses lots of signaling resources.

FIG. 3 illustrates a flow diagram 300 of an exemplary method to reduce TA report signaling overhead in accordance with some aspects. The method may be executed as operations of one or more processors of an apparatus that can be employed in a UE. The method may also be executed as instructions on a machine or computer circuitry, where the instructions are included on at least one computer readable medium or one non-transitory machine readable storage medium.

At act 320, the UE acquires a UE specific TA or TA related information. The TA related information is information that represents or can be used to calculate TA, such as UE's location and/or satellite's location. In some aspects, the TA may be calculated by the UE using the TA related information such as UE's location such as UE's global navigation satellite system (GNSS) location and satellite's location such as satellite's ephemeris. In other aspects, the UE may receive or measure its TA related information such as location information and then transmit, via a non-terrestrial equipment, the TA related information to a BS to calculate the TA by the BS.

At act 322, in order to reduce TA report signaling overhead, the UE does not report or update the TA or TA related information every time an uplink-downlink scheduling is needed. The UE uses a TA updating criteria to determine whether to update its TA or TA related information to the BS. The TA updating criteria can be in various forms such as whether TA changes; whether the change exceeds a certain threshold; whether a pre-set periodicity reaches; whether the UE receives a TA updating request; and the like. More details follow the illustration of act 324 and act 326.

At act 324, if the TA updating criteria is not met, the UE does not transmit the UE specific TA or TA related information to BS. The BS may use previously stored TA or TA related information; estimate a new TA from previously received and stored TA and TA drift rate; or calculate and estimate a new TA from previously received and stored TA related information and change rate of TA related information, as some examples.

At act 326, if the TA updating criteria is met. The UE transmits and updates the TA or TA related information to the BS.

Referring back to act 320, in some aspects, the UE reports a change rate of the TA or the TA related information when reporting the TA or the TA related information to predict or estimate new TA or TA related information. For example, UE reports TA and a drift rate of TA. The drift rate may be derived from TA change overtime or changes of UE's location and satellite's location over time. Then a new TA is calculated by the BS rather than being reported by UE every time. As another example, UE reports its location and its velocity. UE does not update its location and velocity unless the previously reported values are outdated.

In some aspects, UE only updates TA or TA related information when there is a change exceeding a threshold for the TA or TA related information and does not report TA or TA related information if it stays the same or the change is less than the threshold. For example, UE can report and update TA only when TA is changed or the change exceeds a TA change threshold. Alternatively, UE can report its location to the BS for TA calculation only when the UE's location is changed or the change exceeds a location change threshold. The thresholds may be determined based on whether it would affect BS downlink scheduling restriction. For example, TA or TA related information is only updated when a resulted TA change is greater than a threshold of a time difference of one subframe (e.g., 1 ms), where BS downlink scheduling restriction would change. In some further aspects, the threshold can be increased by implementing an extended BS downlink scheduling restriction. By sacrificing subframes available for downlink, TA or TA related information can be reported with large steps.

Figure 4:
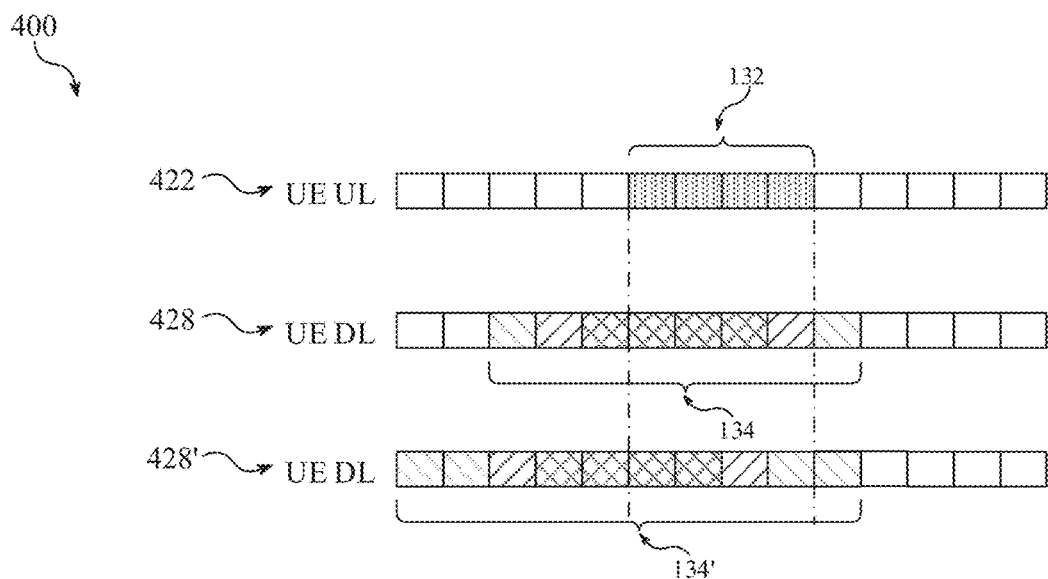
FIG. 4 is a diagram of exemplary user equipment uplink-downlink patterns showing a relaxed TA signaling with an extended base station downlink scheduling restriction.

FIG. 4 illustrates a diagram 400 of exemplary user equipment uplink-downlink patterns 422, 428, 428' showing a relaxed TA signaling with an extended base station downlink scheduling restriction. The pattern 422 shows an uplink 132 of four subframes as an example. The pattern 428 shows an example of a BS downlink scheduling restriction discussed above associated with FIG. 1. An example of a shifted guard period 134 is shown with a TA change of one subframe (e.g., 1 ms) not updated by the downlink scheduling. When the original guard period is extended to include two subframes ahead and two subframes following the uplink 132, the shifted guard period 134 still blocks the four subframes of the uplink 132 and at least one subframe ahead and after the uplink 132. Therefore, UE does not need to report TA change TA' if |TA'-TA|<1 ms. The pattern 428' shows an example of a further extended BS downlink scheduling restriction. An example of a further shifted guard period 134' is shown with a TA change of two subframe (e.g., 2 ms) not updated by the downlink scheduling. Since the original guard period includes extended restriction subframes (in this example three subframes ahead and three subframes following the uplink 132), the shifted guard period 134' still blocks the four subframes of the uplink 132 and at least one subframe ahead and after the uplink 132. Therefore, UE does not need to report TA' if |TA'-TA|<2 ms. The shift of TA' can also be of any fractions of subframes, such as ⅛, ¼, ½, ¾, or the like.

In some alternative aspects, UE reports TA with a periodicity. The periodicity could be configured by network. The periodicity could be broadcasted via SIB, or RRC configuration. In some alternative aspects, UE reports TA at the request of network. Network requests the UE-specific TA report, and UE reports it at the request. The UE may not report TA unless receiving a TA updating request.

It is understood that while the relaxed TA signaling reduces TA report overhead, however, insufficient TA updates would cause uplink-downlink transmission interference or waste subframe resources if using overly extended downlink scheduling restrictions. In some aspects, the maximum possible threshold value is configured or pre-defined. A list of threshold values may be pre-defined, and only one value is selected each time. In the above discussions, the TA report from UE could be UE specific TA (TA between UE and serving satellite) or full TA (TA between serving satellite and base station plus UE specific TA). In some aspects, only the differential TA is reported from UE.

Techniques Related to Uplink Transmission Timing

In current MTC, UE contiguous uplink transmission time is fixed (e.g., 256 ms), and then stopped for a fixed time (e.g., 40 ms) for downlink reception and re-synchronization. In NTN, in some cases, satellites move quickly relative to the earth. For example, satellites in low Earth orbit (LEO) fly at a fast pace proximity to Earth and therefore introduce large timing drift rate and large Doppler shift. In these cases, variable uplink transmission time can be implemented and configured to accommodate the large timing drift rate and large Doppler shift. In some other cases, satellites are relative static to the earth. For example, satellites in geostationary orbit (GEO) orbit along Earth's equator and have a nearly constant distance to a fixed ground location. In these cases, a fixed contiguous uplink transmission time can be adopted.

Figure 5A:
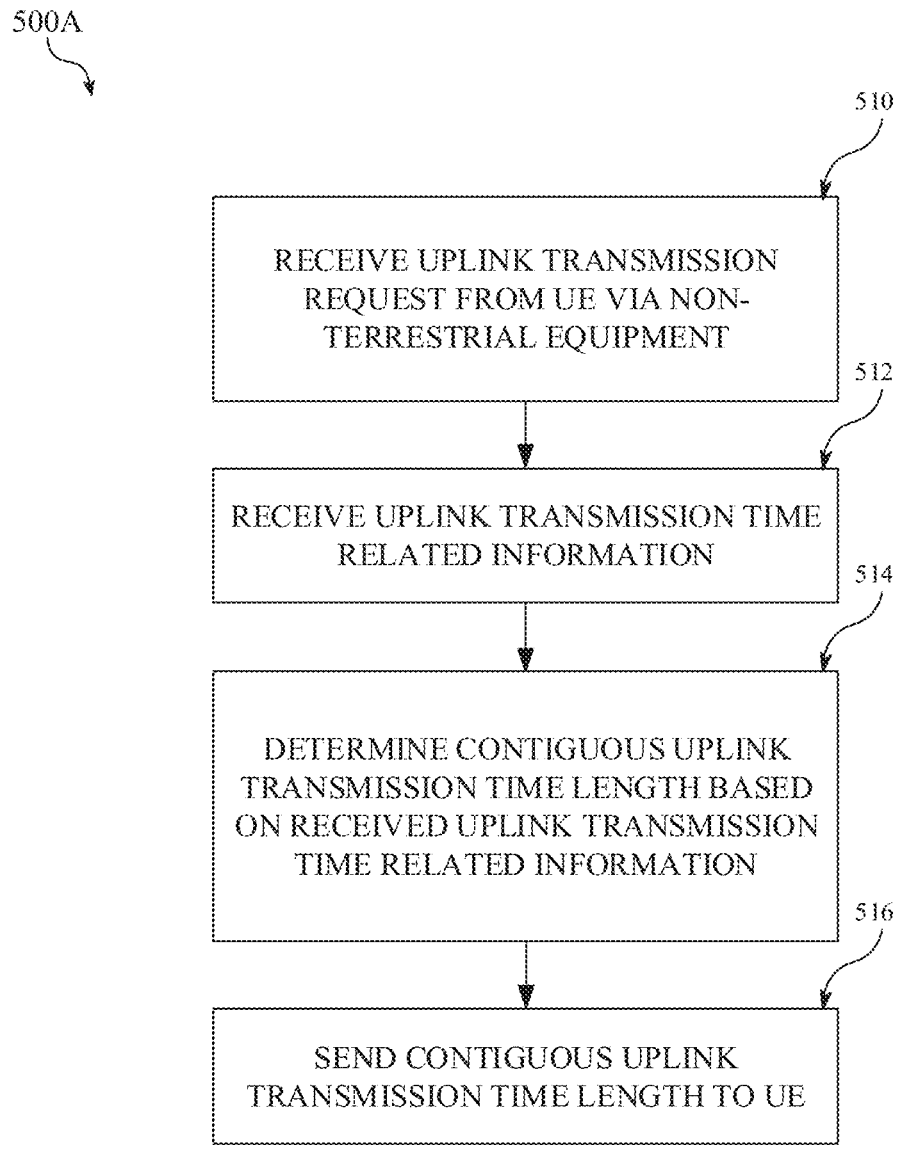
FIG. 5A is a flow diagram of an exemplary method to use a variable contiguous uplink transmission time in accordance with some aspects.

FIG. 5A is a flow diagram 500A of an exemplary method to use a variable contiguous uplink transmission time in accordance with some aspects. The method may be executed as operations of one or more processors of an apparatus that can be employed in a BS. The method may also be executed as instructions on a machine or computer circuitry, where the instructions are included on at least one computer readable medium or one non-transitory machine readable storage medium.

At act 510, an uplink transmission request is received from a UE. As an example, the uplink transmission request may be transmitted to a BS through a RA (random access) process using NPRACH (physical random access channel) or through a UCI (uplink control information) carried by NPUSCH.

At act 512, an uplink transmission time related information is received from the UE. In some aspects, the uplink transmission time related information includes a service link timing drift rate, a common timing drift rate or both the service link timing drift rate and the common timing drift rate. The service link timing drift rate is UE specific and is measured by the UE based on UE's location and satellite's location. The common timing drift rate may include feeder link timing drift rate and may be broadcasted and received by the UE.

At act 514, a variable contiguous uplink transmission time length is determined/configured based on the uplink transmission time related information. For example, if a timing drift rate is 40 μs/s, the contiguous uplink transmission time can be 100 ms.

At act 516, the determined contiguous uplink transmission time length is sent to the UE so that UE can transmit uplink signal to the BS within the determined contiguous uplink transmission time length via a non-terrestrial equipment. In some aspects, the contiguous uplink transmission time information is transmitted through explicit signaling. For example, the contiguous uplink transmission time length can be transmitted through SIB (system information block), RRC (radio resource control) configuration, or dynamic signaling such as DCI. After transmitting for the contiguous uplink transmission time length (100 ms for the above example), UE stops uplink transmission and performs re-synchronization for downlink reception.

Figure 5B:
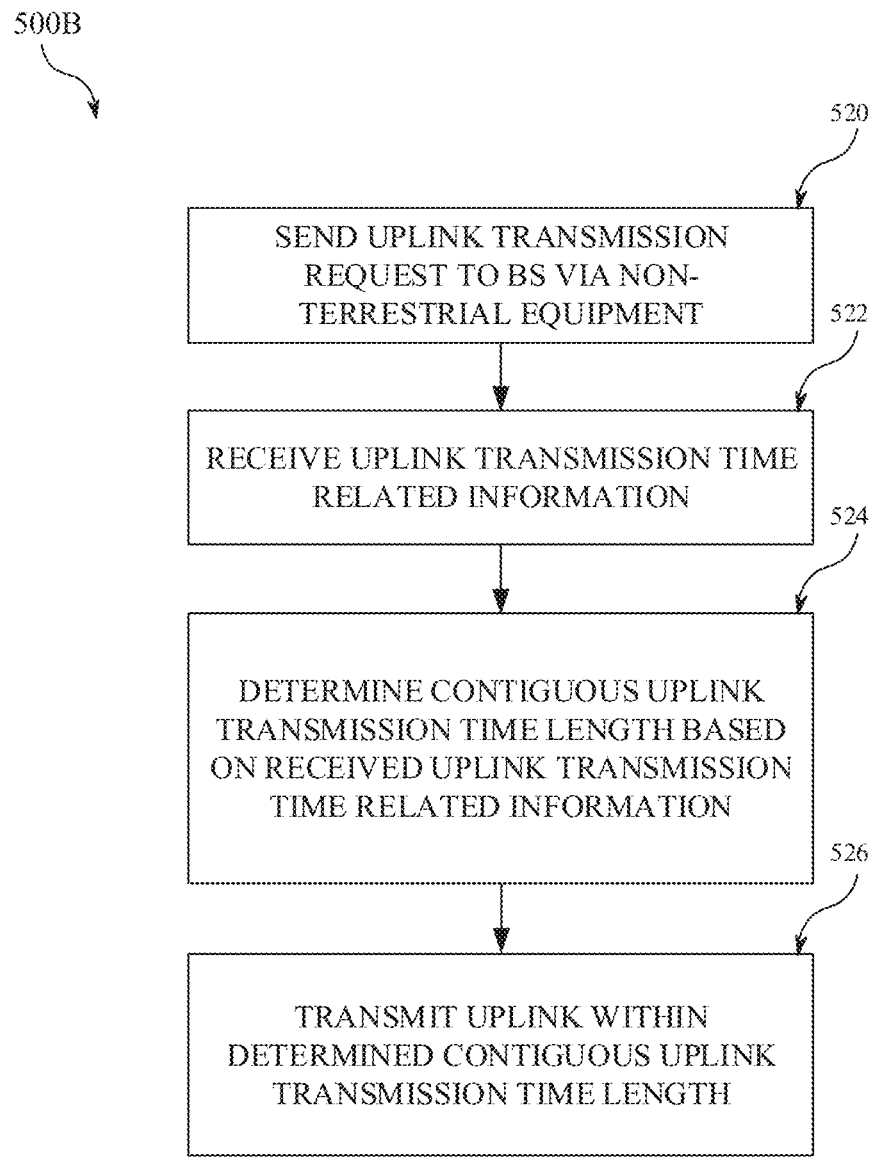
FIG. 5B is a flow diagram of an exemplary method to use a variable contiguous uplink transmission time in accordance with some additional aspects.

FIG. 5B is a flow diagram 500B of an exemplary method to use a variable contiguous uplink transmission time in accordance with some additional aspects. The method may be executed as operations of one or more processors of an apparatus that can be employed in a UE. The method may also be executed as instructions on a machine or computer circuitry, where the instructions are included on at least one computer readable medium or one non-transitory machine readable storage medium.

At act 520, an uplink transmission request is sent from a UE. As an example, the uplink transmission request may be transmitted to a BS through a RA (random access) process using NPRACH (physical random access channel) or through a UCI (uplink control information) carried by NPUSCH.

At act 522, an uplink transmission time related information is received. In some aspects, the uplink transmission time related information includes a service link timing drift rate, a common timing drift rate or both the service link timing drift rate and the common timing drift rate. The service link timing drift rate is UE specific and is measured/estimated by the UE based on UE's location and satellite's location. The common timing drift rate may include feeder link timing drift rate and may be broadcasted and received by the UE. In some aspects, the contiguous uplink transmission time information is transmitted through implicit signaling. For example, the network can broadcast (e.g. through DCI N0 format) the common timing drift rate.

At act 524, a variable contiguous uplink transmission time length is determined/configured based on the uplink transmission time related information. The UE may calculate the contiguous uplink transmission time length based on an overall timing drift rate which may include the common timing drift rate and the service link timing drift rate. For example, if a timing drift rate is 40 µs/s, the contiguous uplink transmission time can be 100 ms.

At act 526, an uplink is transmitted from the UE to the BS within the determined contiguous uplink transmission time length via a non-terrestrial equipment.

In some aspects, the contiguous uplink transmission time length is calculated to keep an overall drift smaller than a time length of a cyclic prefix for uplink transmission on NPUSCH or a half of the time length of a cyclic prefix for uplink transmission on NPUSCH. For example, a type 1 FDD frame structure may have 7 symbols with normal cyclic prefix for a normal mode. The first symbol may have a cyclic prefix of length Tcp of 160 Ts (~5.2 µs), and the remaining six symbols may have a cyclic prefix of length Tcp of 144 Ts (~4.7 µs). As an example, when a timing drift rate is 20 µs/s, in order to keep the total drift smaller than a half of Tcp (~2.35 µs), the contiguous uplink transmission time is restricted to be equal or less than approximately 117 ms.

In addition, for both FIG. 5A and FIG. 5B, the maximum number of uplink transmission repetitions may be further restricted based on the restricted contiguous uplink transmission time to avoid asynchronous uplink transmission. For example, for an uplink transmission of a 4 subframes using 4 ms, the maximum number of uplink transmission repetitions may be restricted to 29 repetitions, such that the uplink transmission can be finished within one contiguous uplink transmission time. In some aspects, the signal indicating the maximum number of uplink transmission repetitions may be transmitted from BS to UE via DCI N0 format.

Enlarged Uplink Compensation Gap

In terrestrial networks (TN), UE receives downlink synchronization signal to apply uplink synchronization. But in NTN, UE's location signal and satellite's location broadcast information are needed together with the downlink synchronization signal to determine service link TA. UE's location (e.g., GNSS location) measurement requires a relative long time window (e.g. around 1 s), and previous uplink compensation time gap (e.g. 40 ms) is not enough.

Accordingly, in some aspects, an enlarged uplink compensation gap between downlink reception and uplink transmission is implemented. For example, an increased time gap may be arranged between DCI N0 and NPUSCH format 1 for UE to acquire its location, to receive satellite's location, and to calculate TA information before initial uplink transmission. In this way, uplink synchronization can be achieved at the very beginning. The UE's location measurement may not be performed frequently, and only be performed when the enlarged uplink compensation time gap is granted to prepare for subsequent uplink transmission. Because of the very long time consuming of measuring TA related information, the enlarged uplink compensation gap is much greater than a time gap not measuring the UE's location. In some aspects, the enlarged uplink compensation gap is at least 20 times greater than a time gap not measuring the UE's location.

Figure 5C:
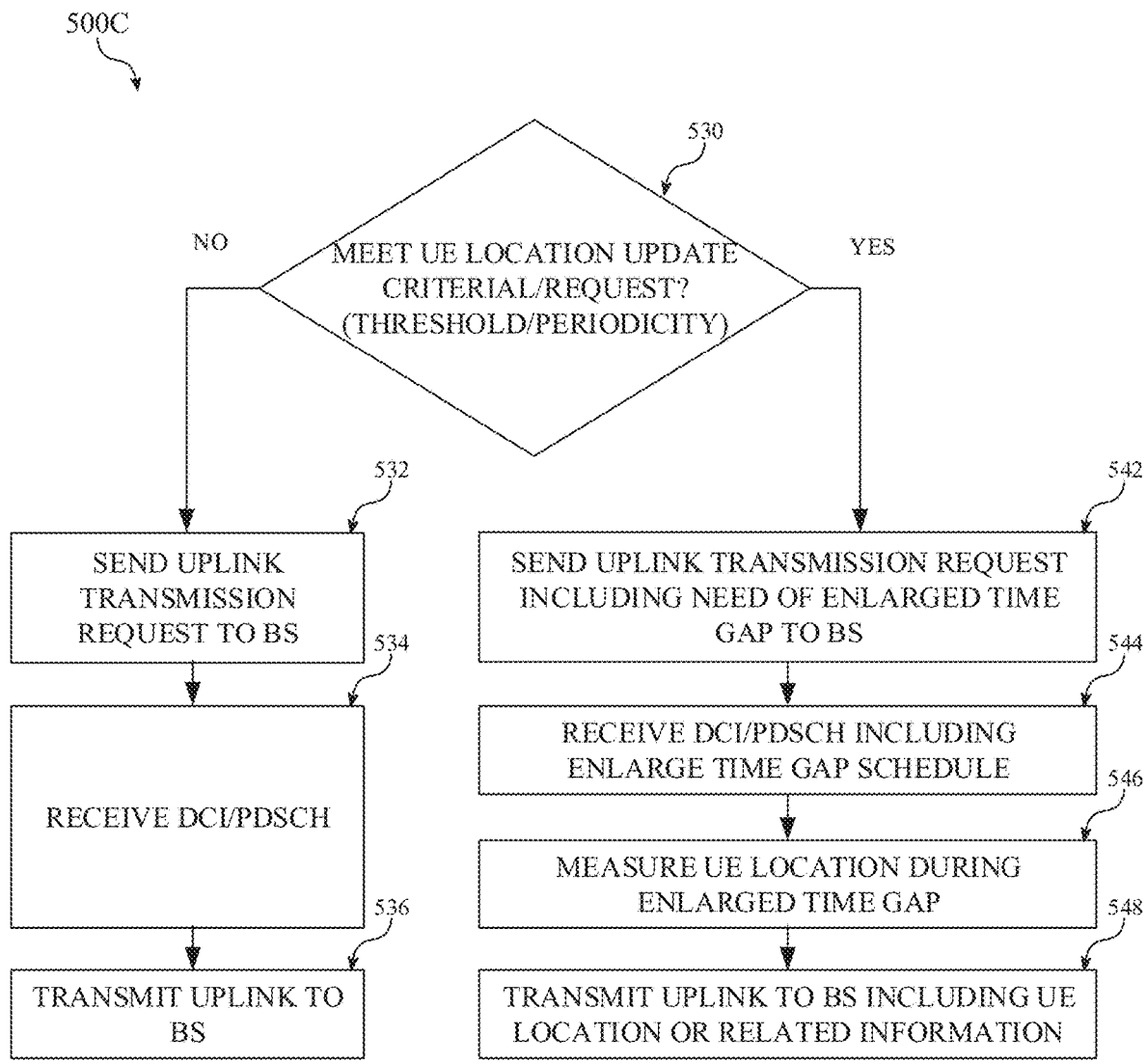
FIG. 5C is a flow diagram of an exemplary method to use an enlarged uplink compensation gap to maintain uplink synchronization for an uplink transmission in accordance with some additional aspects.

FIG. 5C illustrates a flow diagram 500C of an exemplary method to use an enlarged uplink compensation gap to maintain uplink synchronization for an uplink transmission in accordance with some additional aspects. The method may be executed as operations of one or more processors of an apparatus that can be employed in a UE. The method may also be executed as instructions on a machine or computer circuitry, where the instructions are included on at least one computer readable medium or one non-transitory machine readable storage medium.

At act 530, a UE determines whether uplink synchronization related information needs to be acquired or updated. For example, the UE's location signal may need to be measured if it is determined a TA updating criteria is met. Referring to above discussion associated with FIG. 3, the TA updating criteria can be a TA change threshold, a periodicity, a request from a BS, among other TA updating criteria.

At act 532, if it is determined the uplink synchronization related information is not needed, a regular uplink transmission request is sent to a BS. Then at act 534, the UE receives downlink including uplink grant and scheduling and/or downlink scheduling. Then at act 536, the UE transmits uplink such as uplink data signal or downlink HARQ-ACK signal to the BS.

At act 542, if it is determined the uplink synchronization related information needs to be acquired or updated, an uplink transmission request is sent to the BS including a request of enlarged uplink compensation gap. As an example, the uplink transmission request may be transmitted to the BS through a RA (random access) process using NPRACH (physical random access channel) or through a UCI (uplink control information) carried by NPUSCH. Then at act 544, the UE receives downlink (e.g. NPDCCH/PDSCH) including an enlarged uplink compensation gap grant (e.g. through DCI N0), uplink grant and scheduling (e.g. through DCI N0), and downlink scheduling (e.g.

through DCI N1). Then, at act 546, the enlarged uplink compensation gap is used to acquire or update the uplink synchronization related information. For example, the UE's location may be measured during the enlarged uplink compensation gap. Then at act 548, the UE transmit uplink (e.g. NPUSCH) to the BS.

In some aspects, the enlarged uplink compensation time gap is requested by the UE and then granted by the BS through DCI N0, and the uplink transmission includes NPUSCH format 1 after the enlarged uplink compensation gap. In some aspects, the enlarged uplink compensation time gap is requested by the UE and then granted by the BS through NPDSCH, and the uplink transmission includes NPUSCH format 2 after the enlarged uplink compensation gap.

Timing Relationship Enhancement for Uplink Transmission

Figure 6:
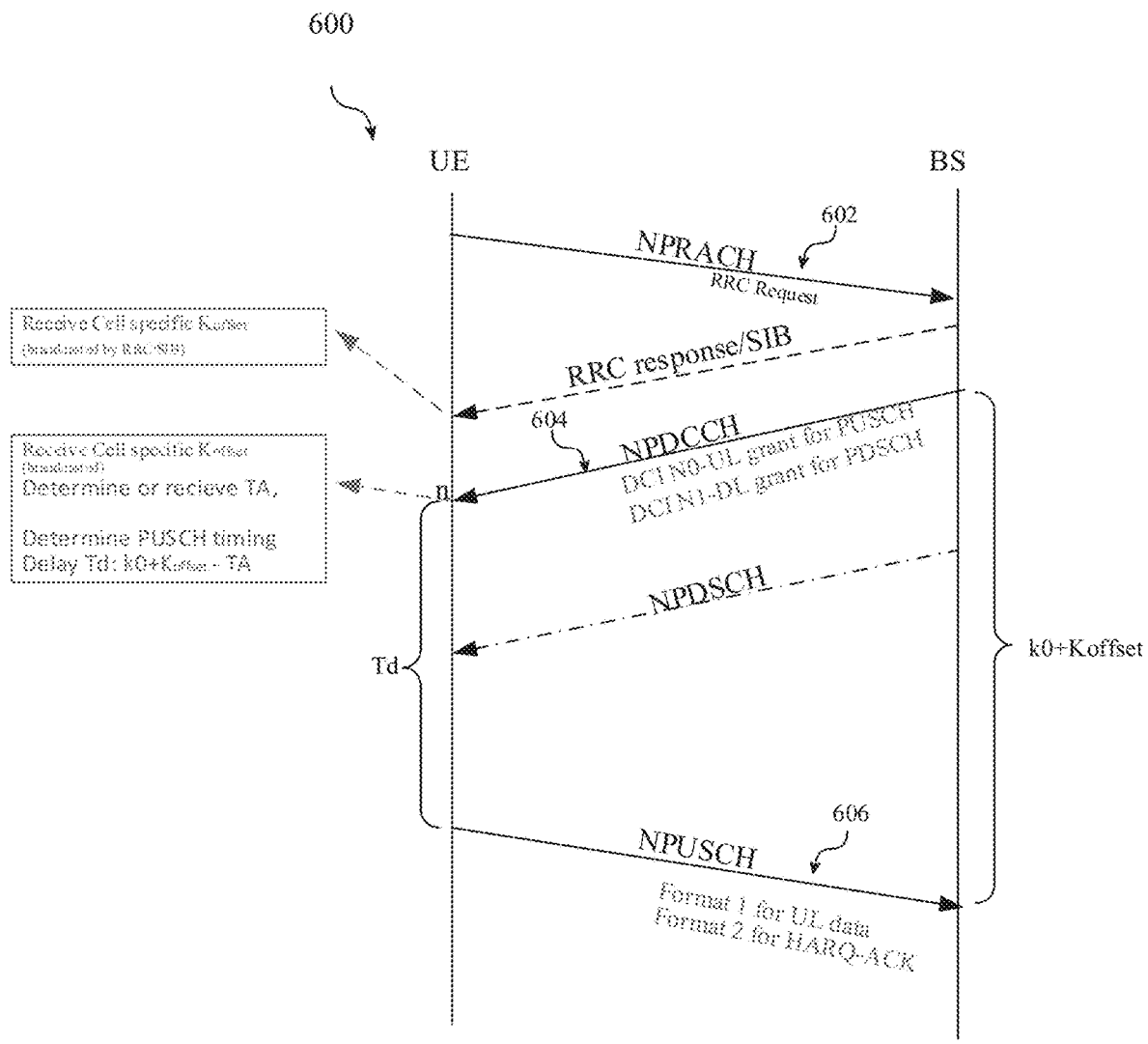
FIG. 6 is a diagram of a wireless communication system that enhances timing relationship for uplink transmission in accordance with some aspects.

FIG. 6 illustrates a diagram 600 of a wireless communication system that enhances timing relationship for uplink transmission in accordance with some aspects.

At act 602, for initial signal transmission, a random access may be performed by a UE to a BS. An RRC connected request may be transmitted from the UE to a BS within NPRACH.

At act 604, as an example, the UE may receive a downlink control signal (e.g., NPDCCH) from the BS with DCI ending in downlink subframe n. The downlink control signal may include an uplink grant or a downlink grant. As an example, the uplink grant may be carried in DCI N0 of NPDCCH. The downlink grant may be carried in DCI N1 of NPDCCH Then, the UE may determine or receive a TA. In some aspects, initial TA may be based on UE's location and a servicing satellite's location, as well as a broadcasted common TA between the serving satellite and a timing reference point. The UE may update the TA when a TA updating criteria is met, similar as discussed above associated with FIG. 3B.

A cell-specific time offset Koffset and/or other time offset parameters are also acquired by the UE. Koffset may represent the amount of subframe offset between DCI and the uplink transmission. Koffset may or may not be updated by a UE-specific Koffset during RRC connected mode. In some aspect, the time offset Koffset is equal to TA or two times propagation delay (i.e., round-trip propagation delay). In other aspects, the time offset Koffset is greater than TA. In some aspects, the TA and Koffset are used jointly by the UE. For example, while Koffset may be used to determine which UL subframe for its uplink transmission, TA is used to determine when to send a UL subframe. In NR system, the uplink transmission timing may only be determined based on the Koffset, but not the TA, since TA is almost negligible comparing to Koffset. In contrast, in NTN for LTE, TA is of significance to be considered when determining the uplink transmission timing.

At 606, the UE transmits uplink based on the determined uplink transmission timing. As an example, an uplink data may be transmitted using NPUSCH format 1 subframes $n_0$, $n_1, \ldots, n_{N+1}$, where no starts after the subframe n+k0+Koffset−TA (n plus k0 plus Koffset minus TA) for FDD, and where no starts after the subframe k0+Koffset−TA for TDD (k0 plus Koffset minus TA). In this case, n is NPDCCH DCI format N0 ending subframe, Koffset is a cell-specific time offset. As another example, an uplink NPUSCH carrying ACK/NACK response may be transmitted using NPUSCH format 2 starting after the end of a NPDSCH transmission and k0+Koffset−TA−1 (k0 plus Koffset minus TA minus 1) for FDD.

In NTN, a HARQ feedback (ACK/NACK) transmission takes longer time because of large propagation delay between the UE and the satellite. When a HARQ process has enabled feedback, UE does not expect next downlink signal with the same HARQ process number before the last subframe carrying the ACK/NACK (e.g., in NPUSCH format 2) corresponding to the current downlink signal plus a round trip time between the UE and the network.

In some aspects, the HARQ feedback transmission is disabled from sending to the satellite by the UE for energy saving purpose. In this case, the UE does not expect another downlink signal with the same HARQ process number before the last subframe carrying the current downlink signal. When the HARQ feedback transmission is disabled, a HARQ-ACK resource field (e.g. 4 bits in DCI format N1) is not used. In some aspects, the HARQ-ACK resource field is reserved for HARQ process with disabled feedback. In some alternative aspects, the HARQ-ACK resource field is re-interpreted to enhance reliability of the downlink transmission. For example, some part of the HARQ-ACK resource field may be used to indicate the minimum time gap between the last subframe of the current downlink signal transmission and the first subframe of the next downlink signal transmission. Then, the next downlink signal could carry same or different transport block. In some cases, a pre-defined or configured table is used to indicate the time gap, based on the bits in DCI Format N1.

Figure 7:
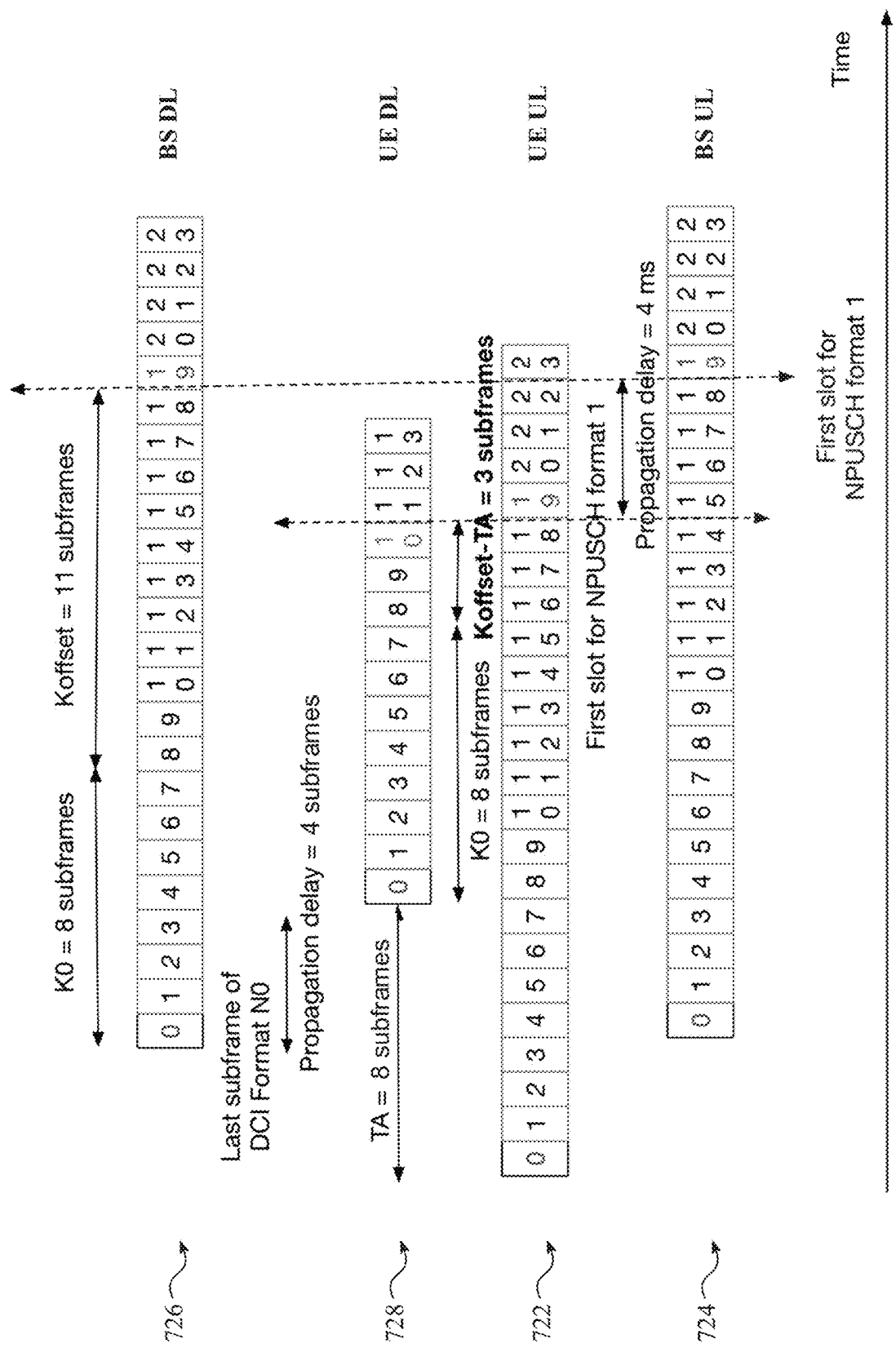
FIG. 7 is a timing diagram showing an exemplary timing relationship enhancement for uplink transmission according to some aspects.

FIG. 7 illustrates a timing diagram showing an exemplary timing relationship enhancement for uplink transmission according to some aspects. Patterns 722, 724, 726, and 728 are shown along a relative time line to show uplink transmission timing from a specific UE to a BS. For this example, it is assumed that the UE specific TA is 8 subframes, k0 is 8 subframes, the cell specific Koffset is 11 subframes, and the last subframe of DCI N0 is subframe 0. Assume BS uplink and BS downlink are aligned.

As shown by the patterns 726 and 728, UE downlink is delayed form BS downlink by a propagation delay (e.g., 4 subframes). As shown by the pattern 724 aligned with the pattern 726, an uplink transmission is scheduled starting from a subframe k0+Koffset (e.g. subframe 19). Koffset is added to accommodate long transmission delay of NTN. As shown by the patterns 728 and 722, upon receiving uplink grant (e.g. DCI format N0), a TA is acquired (e.g. 8 subframes), and UE determines a start subframe (e.g. subframe 11) of the uplink transmission by adding k0+Koffset−TA to the last subframe of DCI format N0.

Figure 8:
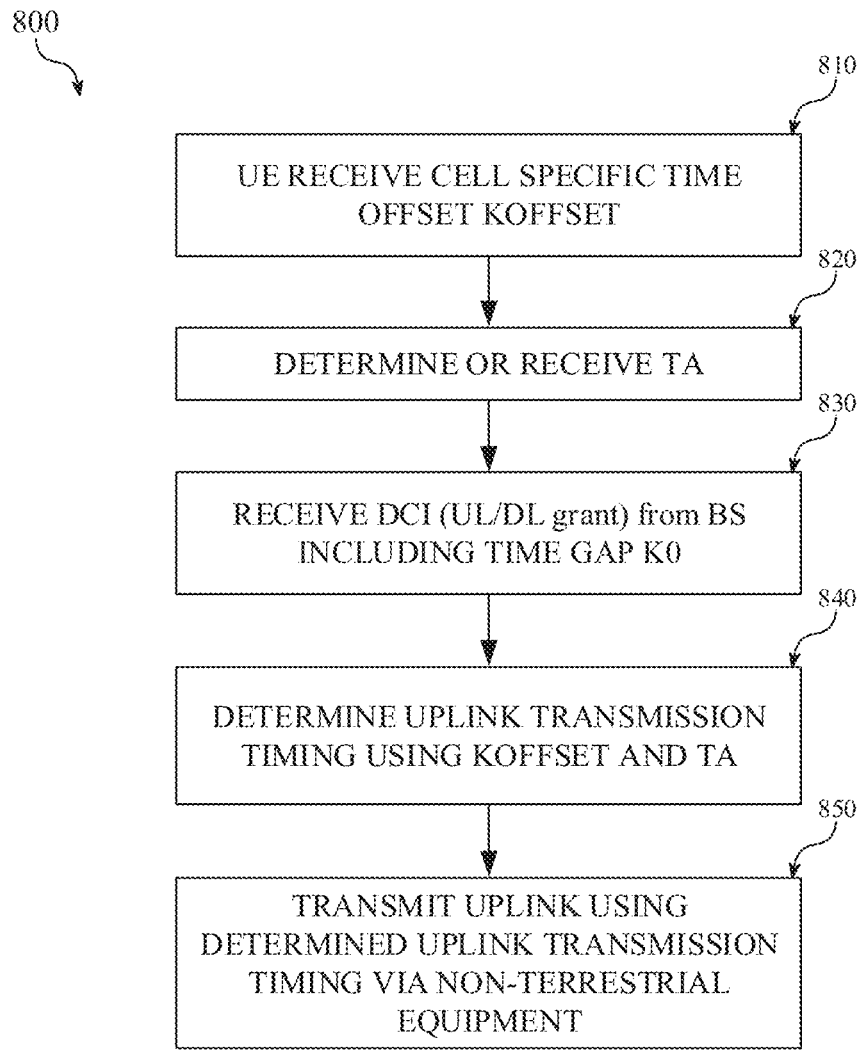
FIG. 8 is a flow diagram of an exemplary method to enhance timing relationship for uplink transmission according to some aspects.

FIG. 8 illustrates a flow diagram 800 of an exemplary method to enhance timing relationship for uplink transmission according to some aspects. The method may be executed as operations of one or more processors of an apparatus that can be employed in a UE. The method may also be executed as instructions on a machine or computer circuitry, where the instructions are included on at least one computer readable medium or one non-transitory machine readable storage medium.

At act 810, the UE receives a time gap K0 indicating a first amount of subframes between the last subframe of DCI and NPDSCH a cell-specific Koffset indicating a second amount of subframes between NPDSCH and the start subframe of an uplink transmission to be scheduled.

At act 820, the UE determines or receives a TA. In some aspects, the TA corresponds to a time length of a round trip delay (RTD) from a first time the UE transmits uplink signals to the BS/network via a non-terrestrial equipment to a second time the UE receives downlink signals from the BS/network via the non-terrestrial equipment. In some aspects, the TA includes a service link propagation delay and/or a feeder link propagation delay. The service link propagation delay is UE specific and is measured by the UE based on UE's location and satellite's location. The feeder link propagation delay may be broadcasted and received by the UE.

At act 830, a downlink control signal is received including an uplink grant or a downlink grant. As an example, the uplink grant may be carried in DCI N0 of NPDCCH. The downlink grant may be carried in DCI N1 of NPDCCH. In some aspects, The TA is not checked or updated until the downlink control signal is received.

At act 840, an uplink transmission timing is determined for an uplink transmission based on the cell-specific Koffset and the TA. In some aspects, a timing for NPUSCH format 1 transmission is determined for uplink data transmission. The NPUSCH format 1 transmission may start from K0+Koffset−TA subframes after the last subframe of the DCI N0. In some alternative aspects, a timing for NPUSCH format 2 is determined for ACK/NACK uplink transmission for a downlink data transmission. The NPUSCH format 2 transmission may start from K0+Koffset−TA−1 subframes after the last subframe of the DCI N1.

At act 850, the uplink (e.g. NPUSCH format 1 or NPUSCH format 2) is transmitted using the determined uplink transmission timing.

Figure 9:
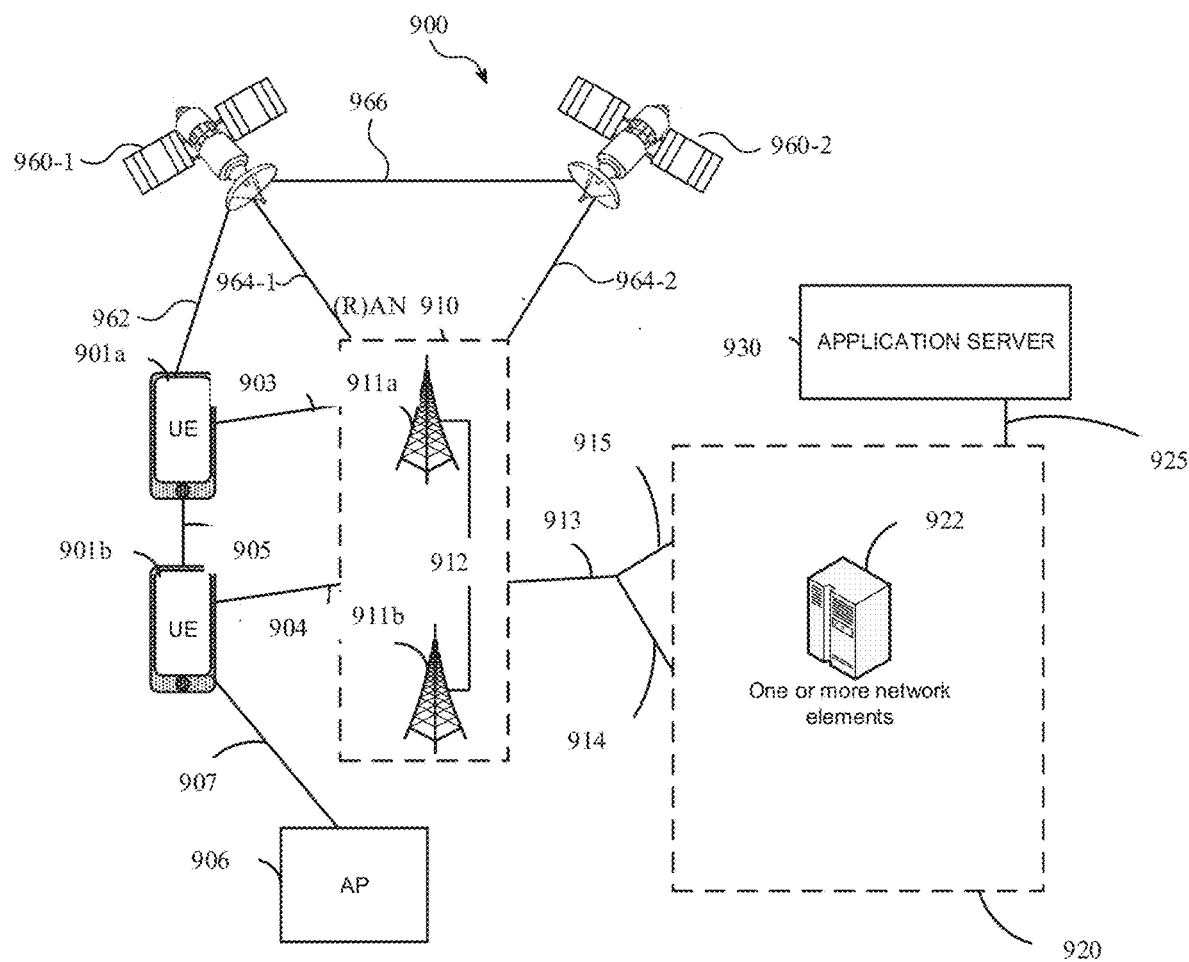
FIG. 9 illustrates an example communication network, in accordance with various aspects disclosed.

FIG. 9 illustrates an example architecture of a system 900 of a communication network, in accordance with various aspects. The following description is provided for an example system 900 that operates in conjunction with the LTE system standards and 5G or NR system standards as provided by 3GPP technical specifications. However, the example aspects are not limited in this regard and the described aspects may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by FIG. 9, the system 900 includes UE 901a and UE 901b (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some aspects, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with a RAN 910. In aspects, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In aspects, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901b is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 702.11 protocol, wherein the AP 906 would comprise a wireless fidelity (Wi-Fi®) router. In this example, the AP 906 is shown to be connected to the Internet without connecting to the core network of the wireless system (described in further detail below). In various aspects, the UE 901b, RAN 910, and AP 906 may be configured to utilize LWA operation and/or LWIP operation. The LWA operation may involve the UE 901b in RRC_CONNECTED being configured by a RAN node 911a-b to utilize radio resources of LTE and WLAN. LWIP operation may involve the UE 901b using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911a and 911b (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As described below, in some implementations, satellites 960 may operate as bases stations (e.g., RAN nodes 911) with respect to UEs 901. As such, references herein to a BS, RAN node 911, etc., may involve implementations where the base station, RAN node 911, etc., is a terrestrial network node and also to implementation where the base station, RAN node 911, etc., is a non-terrestrial network node (e.g., satellite 160).

As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various aspects, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various aspects, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 702.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including NPDSCH or NPUSCH transmissions, respectively, may have an LAA contention window that is variable in length between X and Y ECCA slots, where X and Y are minimum and maximum values for the CWSs for LAA. In one example, the minimum CWS for an LAA transmission may be 8 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different NPUSCH starting positions within a same subframe.

The NPDSCH carries user data and higher-layer signaling to the UEs 901. The NPDCCH carries information about the transport format and resource allocations related to the NPDSCH channel, among other things. It may also inform the UEs 901 about the transport format, resource allocation, and HARQ information related to the uplink shared channel. Typically, downlink scheduling (assigning control and shared channel resource blocks to the UE 901b within a cell) may be performed at any of the RAN nodes 911 based on channel quality information fed back from any of the UEs 901. The downlink resource assignment information may be sent on the NPDCCH used for (e.g., assigned to) each of the UEs 901.

The RAN 910 is shown to be communicatively coupled to a core network—in this aspect, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some aspects, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, example network 900 may include an NTN that may comprise one or more satellites 960-1 and 960-2 (collectively, "satellites 960"). Satellites 960 may be in communication with UEs 901 via service link or wireless interface 962 and/or RAN 910 via feeder links or wireless interfaces 964 (depicted individually as 964-1 and 964). In some implementations, satellite 960 may operate as a passive or transparent network relay node regarding communications between UEs 901 and the terrestrial network (e.g., RAN 910). In some implementations, satellite 960 may operate as an active or regenerative network node such that satellite 960 may operate as a base station to UEs 901 (e.g., as a gNB of RAN 910) regarding communications between UE 901 and RAN 910. In some implementations, satellites 960 may communicate with one another via a direct wireless interface (e.g., 966) or an indirect wireless interface (e.g., via RAN 910 using interfaces 964-1 and 964-2). Additionally, or alternatively, satellite 960 may include a GEO satellite, LEO satellite, or another type of satellite. Satellite 960 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 960 may operate as bases stations (e.g., RAN nodes 911) with respect to UEs 901. As such, references herein to a base station, RAN node 911, etc., may involve implementations where the base station, RAN node 911, etc., is a terrestrial network node and implementation, where the base station, RAN node 911, etc., is a non-terrestrial network node (e.g., satellite 960).

Figure 10:
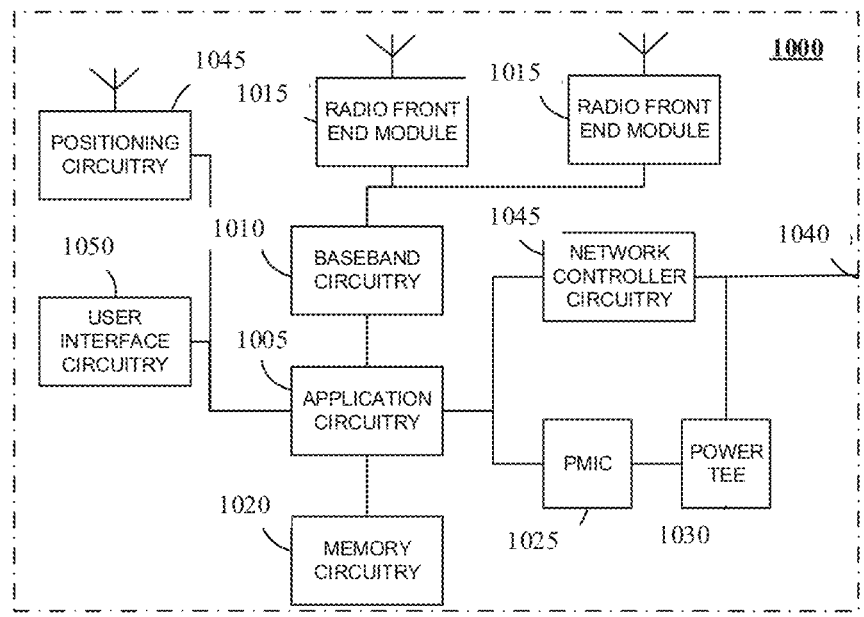
FIG. 10 illustrates an example of an infrastructure equipment device (e.g., BS, eNB, gNB), in accordance with various aspects disclosed.

FIG. 10 illustrates an example of infrastructure equipment 1000 in accordance with various aspects. The infrastructure equipment 1000 (or "system 1000") may be implemented as a base station, radio head, RAN node such as the RAN nodes 911 and/or AP 906 shown and described previously, application server(s) 930, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some aspects, the device 1000 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1005 may comprise, or may be, a special-purpose processor/controller to operate according to the various aspects herein. As examples, the processor(s) of application circuitry 1005 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 1000 may not utilize application circuitry 1005, and instead may include a special-purpose processor/controller to process IP data received from an EPC or SGC, for example.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 11:
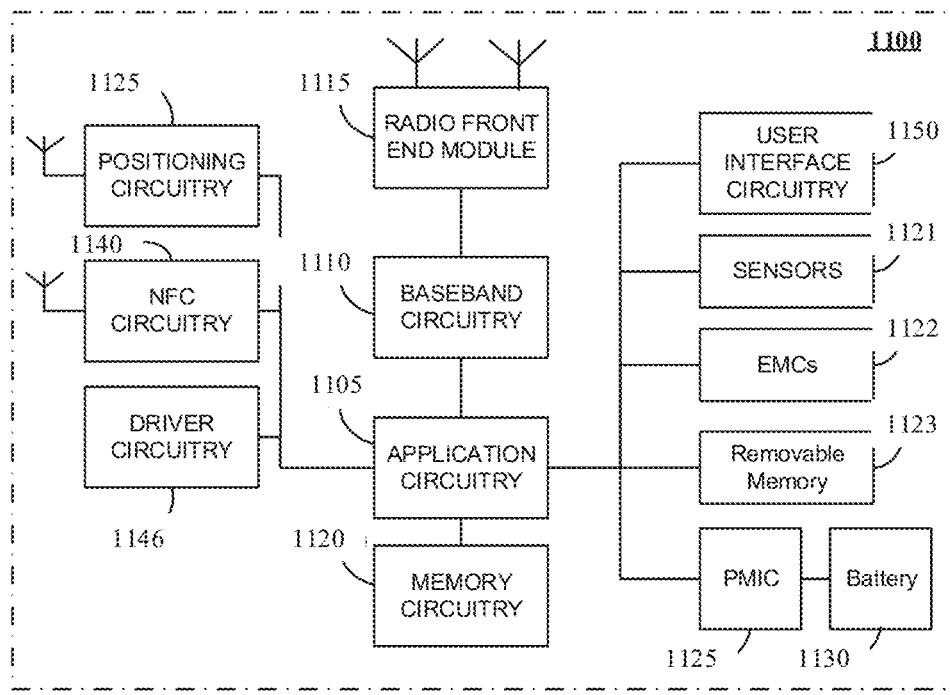
FIG. 11 illustrates an example of a user equipment device (referred to herein interchangeably as a "UE" or "UE device"), in accordance with various aspects disclosed.

FIG. 11 illustrates an example of a platform 1100 (or "device 1100") in accordance with various aspects. In aspects, the computer platform 1100 may be suitable for use as UEs 901, application servers 930, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1105 may include a general or special purpose processor, such as an A-series processor (e.g., the A13 Bionic), available from Apple® Inc., Cupertino, CA or any other such processor. The processors of the application circuitry 1105 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R and Cortex-M family of processors; or the like. In some implementations, the application circuitry 1105 may be a part of a system on a chip (SoC) in which the application circuitry 1105 and other components are formed into a single integrated circuit, or a single package.

The baseband circuitry 1110 may be implemented, for example, as a solder-down substrate including one or more integrated circuits, a single packaged integrated circuit soldered to a main circuit board or a multi-chip module containing two or more integrated circuits.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

Accordingly, apparatus and methods are provided to enhance communications for NTN. In some aspects, an apparatus is configured to be employed in a base station (BS). The apparatus comprises one or more processors configured to schedule an uplink transmission in response to an uplink transmission request from a user equipment (UE) using one or more subframes ranging from a first uplink subframe to a last uplink subframe. The one or more processors are further configured to determine or receive a timing advance (TA) indicating amount of subframes transmitted during a time delay between the UE and the BS and schedule a downlink transmission aligned with the uplink transmission. The downlink transmission is blocked from subframes ranging from TA plus one or more subframes ahead of the first uplink subframe to TA minus one or more subframes ahead of the last uplink subframe. The one or more processors are further configured to transmit and receive, via a non-terrestrial equipment, the uplink and the downlink.

In some aspects, an apparatus is configured to be employed in a user equipment (UE). The apparatus comprises one or more processors configured to determine a timing advance (TA) or a TA related information. The TA indicates amount of subframes transmitted during a time delay between the UE and a timing reference point. The one or more processors are further configured to determine whether a TA updating criteria is met and transmit, via a non-terrestrial equipment, the TA or the TA related information to the BS if the TA updating criteria is met.

In some aspects, an apparatus is configured to be employed in a base station (BS). The apparatus comprises one or more processors configured to receive, via a non-terrestrial equipment, an uplink transmission request from a user equipment (UE) and responsive to the uplink transmission request, determine a variable contiguous uplink transmission time length based on an uplink transmission time related information. The one or more processors are further configured to transmit the determined contiguous uplink transmission time length to the UE.

In some aspects, an apparatus is configured to be employed in a user equipment (UE). The apparatus comprises one or more processors configured to send, via a non-terrestrial equipment, an uplink transmission request to a base station (BS) and to receive uplink transmission time related information from the BS. The one or more processors are further configured to determine a variable contiguous uplink transmission time length based on the received uplink transmission time related information and to transmit uplink within the determined contiguous uplink transmission time length.

In some aspects, an apparatus is configured to be employed in a user equipment (UE). The apparatus comprises one or more processors configured to receive, via a non-terrestrial equipment, a downlink transmission from a base station (BS) including an uplink grant and to schedule an enlarged uplink compensation gap. The enlarged uplink compensation gap is greater than a time gap not measuring the UE's location. The one or more processors are further configured to measure a location of the UE during the enlarged uplink compensation gap and to transmit an uplink transmission to the BS after the enlarged uplink compensation gap.

In some aspects, an apparatus is configured to be employed in a user equipment (UE). The apparatus comprises one or more processors configured to receive a downlink control signal from a base station (BS) including a DCI (downlink control information) and to receive a time gap in DCI indicating a first amount of subframes between the last subframe of DCI and NPDSCH and a time offset indicating a second amount of subframes between NPDSCH and a start subframe of an uplink transmission to be scheduled. The one or more processors are further configured to determine or receive a timing advance (TA) indicating a third amount of subframes transmitted during a time delay between the UE and the BS via a non-terrestrial equipment and to determine an uplink transmission timing using the time gap, the time offset, and the TA. The one or more processors are further configured to transmit, via a non-terrestrial equipment, an uplink using the determined uplink transmission timing.

In some aspects, an apparatus is configured to be employed in a user equipment (UE). The apparatus comprises one or more processors configured to receive, via a non-terrestrial equipment, a downlink control signal from a base station (BS) including a downlink grant and to receive downlink signal in response to the downlink control signal. ACK/NACK (acknowledgement/non-acknowledgement) signaling for the downlink signal is disabled.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

EXAMPLES

Example 1 is a BS, comprising one or more processors configured to schedule an uplink transmission in response to an uplink transmission request from a user equipment (UE) using one or more subframes ranging from a first uplink subframe to a last uplink subframe. The one or more processors are further configured to determine or receive a timing advance (TA) indicating amount of subframes transmitted during a time delay between the UE and the BS and schedule a downlink transmission aligned with the uplink transmission. The downlink transmission is blocked from subframes ranging from TA plus one or more subframes ahead of the first uplink subframe to TA minus one or more subframes ahead of the last uplink subframe. The one or more processors are further configured to transmit and receive, via a non-terrestrial equipment, the uplink and the downlink.

Example 2 is a BS, including the subject matter of example 1, wherein the TA is calculated from a UE location, a serving satellite location, and a BS location, and wherein the UE location is reported to the BS by the UE and is not updated by the UE unless changed.

Example 3 is a BS, including the subject matter of example 1 or example 2, wherein the TA is estimated from previously stored TA and TA drift rate unless an updating criteria is met, the previously stored TA and TA drift rate being received from the UE.

Example 4 is a BS, including the subject matter of example 1 or example 2, wherein the TA is not updated if its change is less than a threshold.

Example 5 is a BS, including the subject matter of examples 1-4, wherein the threshold is one subframe.

Example 6 is a BS, including the subject matter of examples 1-4, wherein the threshold is larger than one subframe; and wherein the downlink transmission is scheduled to be blocked from subframes ranging from more than TA+1 ahead of the scheduled first uplink subframe to less than TA−1 ahead of the scheduled last uplink subframe.

Example 7 is a UE, comprising one or more processors configured to determine a timing advance (TA) or a TA related information. The TA indicates amount of subframes transmitted during a time delay between the UE and a timing reference point. The one or more processors are further configured to determine whether a TA updating criteria is met and transmit, via a non-terrestrial equipment, the TA or the TA related information to the BS if the TA updating criteria is met.

Example 8 is a UE, including the subject matter of example 7, wherein the one or more processors are configured to determine the TA and report to the BS when the updating criteria is met.

Example 9 is a UE, including the subject matter of example 7, wherein the TA related information includes a location of the UE; and wherein the UE does not update the BS the location of the UE unless an updating criteria is met.

Example 10 is a UE, including the subject matter of examples 7-9, wherein the one or more processors are configured to transmit a velocity of the UE to the BS when transmitting the location of the UE.

Example 11 is a UE, including the subject matter of example 7, wherein the one or more processors are configured to report the TA to the BS with a periodicity.

Example 12 is a UE, including the subject matter of examples 7-11, wherein the periodicity is configured by the BS and broadcasted via SIB or RRC configuration.

Example 13 is a UE, including the subject matter of example 7, wherein the one or more processors are configured to report the TA or the TA related information to the BS and is not updated by the UE unless responsive to a TA updating request from the BS.

Example 14 is a BS, comprising one or more processors configured to receive, via a non-terrestrial equipment, an uplink transmission request from a user equipment (UE) and responsive to the uplink transmission request, determine a variable contiguous uplink transmission time length based on an uplink transmission time related information. The one or more processors are further configured to transmit the determined contiguous uplink transmission time length to the UE.

Example 15 is a BS, including the subject matter of example 14, wherein the uplink transmission time related information includes a service link timing drift rate and a common timing drift rate.

Example 16 is a BS, including the subject matter of example 14 or 15, wherein the uplink transmission time related information is reported by the UE and is not updated by the UE unless an updating criteria is met.

Example 17 is a BS, including the subject matter of examples 14-16, wherein the variable contiguous uplink transmission time length is transmitted through SIB (system information block), RRC (radio resource control) configuration, or DCI (downlink control information).

Example 18 is a BS, including the subject matter of examples 14-17, wherein a maximum number of uplink transmission repetitions is restricted to be transmitted within the contiguous uplink transmission time length.

Example 19 is a UE, comprising one or more processors configured to send, via a non-terrestrial equipment, an uplink transmission request to a base station (BS) and to receive uplink transmission time related information from the BS. The one or more processors are further configured to determine a variable contiguous uplink transmission time length based on the received uplink transmission time related information and to transmit uplink within the determined contiguous uplink transmission time length.

Example 20 is a UE, including the subject matter of example 19, wherein the uplink transmission time related information includes a service link timing drift rate and a common timing drift rate.

Example 21 is a UE, comprising one or more processors configured to receive, via a non-terrestrial equipment, a downlink transmission from a base station (BS) including an uplink grant and to schedule an enlarged uplink compensation gap. The enlarged uplink compensation gap is greater than a time gap not measuring the UE's location. The one or more processors are further configured to measure a location of the UE during the enlarged uplink compensation gap and to transmit an uplink transmission to the BS after the enlarged uplink compensation gap.

Example 22 is a UE, including the subject matter of example 21, wherein the downlink transmission includes DCI (downlink control information) N0, and wherein the uplink transmission includes PUSCH format 1.

Example 23 is a UE, including the subject matter of example 21, wherein the downlink transmission includes PDSCH, and wherein the uplink transmission includes PUSCH format 2.

Example 24 is a UE, including the subject matter of example 21, wherein one or more processors are configured to report a need of the enlarged uplink compensation gap to the BS when sending an uplink transmission request to the BS prior to the receiving of the downlink transmission from the BS.

Example 25 is a UE, comprising one or more processors configured to receive a downlink control signal from a base station (BS) including a DCI (downlink control information) and to receive a time gap in DCI indicating a first amount of subframes between the last subframe of DCI and NPDSCH and a time offset indicating a second amount of subframes between NPDSCH and a start subframe of an uplink transmission to be scheduled. The one or more processors are further configured to determine or receive a timing advance (TA) indicating a third amount of subframes transmitted during a time delay between the UE and the BS via a non-terrestrial equipment and to determine an uplink transmission timing using the time gap, the time offset, and the TA. The one or more processors are further configured to transmit, via a non-terrestrial equipment, an uplink using the determined uplink transmission timing.

Example 26 is a UE, including the subject matter of example 25, wherein the DCI includes an uplink grant carried by DCI N0, and the uplink transmission includes uplink data carried by NPUSCH format 1; and wherein the NPUSCH format 1 is transmitted after the last subframe of the DCI N0 plus the first amount and the second amount minus the third amount of subframes.

Example 27 is a UE, including the subject matter of example 25, wherein the DCI includes a downlink grant carried by DCI N1, and the uplink transmission includes HARQ-ACK/NACK carried by NPUSCH format 2; and wherein the NPUSCH format 2 is transmitted one subframe after the last subframe of the DCI N0 plus the first amount and the second amount minus the third amount of subframes.

Example 28 is a UE, comprising one or more processors configured to receive, via a non-terrestrial equipment, a downlink control signal from a base station (BS) including a downlink grant and to receive downlink signal in response to the downlink control signal. ACK/NACK (acknowledgement/non-acknowledgement) signaling for the downlink signal is disabled.

Example 29 is a UE, including the subject matter of example 28, wherein the downlink control signal indicates a minimum time gap between the last subframe of the downlink signal transmission and the first subframe of a next downlink signal transmission.

Example 30 is a UE, including the subject matter of example 28, wherein the downlink control signal indicates a number of repetitions to transmit the downlink signal.

Example 31 is a UE, including the subject matter of example 28, wherein the downlink grant is carried by DCI format N1.

Example 32 is a baseband (BB) processor for a UE, configured to determine a timing advance (TA) or a TA related information. The TA indicates amount of subframes transmitted during a time delay between the UE and a timing reference point. The one or more processors are further configured to determine whether a TA updating criteria is met and transmit, via a non-terrestrial equipment, the TA or the TA related information to the BS if the TA updating criteria is met.

Example 33 is a BB processor, including the subject matter of example 32, wherein the one or more processors are configured to determine the TA and report to the BS when the updating criteria is met.

Example 34 is a BB processor, including the subject matter of example 32, wherein the TA related information includes a location of the UE; and wherein the UE does not update the BS the location of the UE unless an updating criteria is met.

Example 35 is a BB processor, including the subject matter of examples 32-34, wherein the one or more processors are configured to transmit a velocity of the UE to the BS when transmitting the location of the UE.

Example 36 is a BB processor, including the subject matter of example 32, wherein the one or more processors are configured to report the TA to the BS with a periodicity.

Example 37 is a BB processor, including the subject matter of examples 32-36, wherein the periodicity is configured by the BS and broadcasted via SIB or RRC configuration.

Example 38 is a BB processor, including the subject matter of example 32, wherein the one or more processors are configured to report the TA or the TA related information to the BS and is not updated by the UE unless responsive to a TA updating request from the BS.

Example 39 is a BB processor, comprising one or more processors configured to send, via a non-terrestrial equipment, an uplink transmission request to a base station (BS) and to receive uplink transmission time related information from the BS. The one or more processors are further configured to determine a variable contiguous uplink transmission time length based on the received uplink transmission time related information and to transmit uplink within the determined contiguous uplink transmission time length.

Example 40 is a BB processor, including the subject matter of example 39, wherein the uplink transmission time related information includes a service link timing drift rate and a common timing drift rate.

Example 41 is a BB processor, comprising one or more processors configured to receive, via a non-terrestrial equipment, a downlink transmission from a base station (BS) including an uplink grant and to schedule an enlarged uplink compensation gap. The enlarged uplink compensation gap is greater than a time gap not measuring the UE's location. The one or more processors are further configured to measure a location of the UE during the enlarged uplink compensation gap and to transmit an uplink transmission to the BS after the enlarged uplink compensation gap.

Example 42 is a BB processor, including the subject matter of example 41, wherein the downlink transmission includes DCI (downlink control information) N0, and wherein the uplink transmission includes PUSCH format 1.

Example 43 is a BB processor, including the subject matter of example 41, wherein the downlink transmission includes PDSCH, and wherein the uplink transmission includes PUSCH format 2.

Example 44 is a BB processor, including the subject matter of example 41, wherein one or more processors are configured to report a need of the enlarged uplink compensation gap to the BS when sending an uplink transmission request to the BS prior to the receiving of the downlink transmission from the BS.

Example 45 is a BB processor, comprising one or more processors configured to receive a downlink control signal from a base station (BS) including a DCI (downlink control information) and to receive a time gap in DCI indicating a first amount of subframes between the last subframe of DCI and NPDSCH and a time offset indicating a second amount of subframes between NPDSCH and a start subframe of an uplink transmission to be scheduled. The one or more processors are further configured to determine or receive a timing advance (TA) indicating a third amount of subframes transmitted during a time delay between the UE and the BS via a non-terrestrial equipment and to determine an uplink transmission timing using the time gap, the time offset, and the TA. The one or more processors are further configured to transmit, via a non-terrestrial equipment, an uplink using the determined uplink transmission timing.

Example 46 is a BB processor, including the subject matter of example 45, wherein the DCI includes an uplink grant carried by DCI N0, and the uplink transmission includes uplink data carried by NPUSCH format 1; and wherein the NPUSCH format 1 is transmitted after the last subframe of the DCI N0 plus the first amount and the second amount minus the third amount of subframes.

Example 47 is a BB processor, including the subject matter of example 45, wherein the DCI includes a downlink grant carried by DCI N1, and the uplink transmission includes HARQ-ACK/NACK carried by NPUSCH format 2; and wherein the NPUSCH format 2 is transmitted one subframe after the last subframe of the DCI N0 plus the first amount and the second amount minus the third amount of subframes.

Example 48 is a BB processor, comprising one or more processors configured to receive, via a non-terrestrial equipment, a downlink control signal from a base station (BS) including a downlink grant and to receive downlink signal in response to the downlink control signal. ACK/NACK (acknowledgement/non-acknowledgement) signaling for the downlink signal is disabled.

Example 49 is a BB processor, including the subject matter of example 48, wherein the downlink control signal indicates a minimum time gap between the last subframe of the downlink signal transmission and the first subframe of a next downlink signal transmission.

Example 50 is a BB processor, including the subject matter of example 48, wherein the downlink control signal indicates a number of repetitions to transmit the downlink signal.

Example 51 is a BB processor, including the subject matter of example 48, wherein the downlink grant is carried by DCI format N1.

Example 52 is a method, to schedule an uplink transmission in response to an uplink transmission request from a user equipment (UE) using one or more subframes ranging from a first uplink subframe to a last uplink subframe and to determine or receive a timing advance (TA) indicating amount of subframes transmitted during a time delay between the UE and the BS and schedule a downlink transmission aligned with the uplink transmission. The downlink transmission is blocked from subframes ranging from TA plus one or more subframes ahead of the first uplink subframe to TA minus one or more subframes ahead of the last uplink subframe. The method further comprises to transmit and receive, via a non-terrestrial equipment, the uplink and the downlink.

Example 53 is a method, including the subject matter of example 52, wherein the TA is calculated from a UE location, a serving satellite location, and a BS location, and wherein the UE location is reported to the BS by the UE and is not updated by the UE unless changed.

Example 54 is a method, including the subject matter of example 52 or example 53, wherein the TA is estimated from previously stored TA and TA drift rate unless an updating criteria is met, the previously stored TA and TA drift rate being received from the UE.

Example 55 is a method, including the subject matter of example 52 or example 53, wherein the TA is not updated if its change is less than a threshold.

Example 56 is a method, including the subject matter of examples 52-55, wherein the threshold is one subframe.

Example 57 is a method, including the subject matter of examples 52-56, wherein the threshold is larger than one subframe; and wherein the downlink transmission is scheduled to be blocked from subframes ranging from more than TA+1 ahead of the scheduled first uplink subframe to less than TA−1 ahead of the scheduled last uplink subframe.

Example 58 is a method, to determine a timing advance (TA) or a TA related information. The TA indicates amount of subframes transmitted during a time delay between the UE and a timing reference point. The method further comprises to determine whether a TA updating criteria is met and transmit, via a non-terrestrial equipment, the TA or the TA related information to the BS if the TA updating criteria is met.

Example 59 is a method, including the subject matter of example 58, wherein the method further comprises to determine the TA and report to the BS when the updating criteria is met.

Example 60 is a method, including the subject matter of example 58, wherein the TA related information includes a location of the UE; and wherein the UE does not update the BS the location of the UE unless an updating criteria is met.

Example 61 is a method, including the subject matter of examples 58-60, wherein the method further comprises to transmit a velocity of the UE to the BS when transmitting the location of the UE.

Example 62 is a method, including the subject matter of example 58, wherein the method further comprises to report the TA to the BS with a periodicity.

Example 63 is a method, including the subject matter of examples 58-62, wherein the periodicity is configured by the BS and broadcasted via SIB or RRC configuration.

Example 64 is a method, including the subject matter of example 58, wherein the method further comprises to report the TA or the TA related information to the BS and is not updated by the UE unless responsive to a TA updating request from the BS.

Example 65 is a method, to receive, via a non-terrestrial equipment, an uplink transmission request from a user equipment (UE) and responsive to the uplink transmission request, determine a variable contiguous uplink transmission time length based on an uplink transmission time related information. The method further comprises to transmit the determined contiguous uplink transmission time length to the UE.

Example 66 is a method, including the subject matter of example 65, wherein the uplink transmission time related information includes a service link timing drift rate and a common timing drift rate.

Example 67 is a method, including the subject matter of example 65 or 66, wherein the uplink transmission time related information is reported by the UE and is not updated by the UE unless an updating criteria is met.

Example 68 is a method, including the subject matter of examples 65-67, wherein the variable contiguous uplink transmission time length is transmitted through SIB (system information block), RRC (radio resource control) configuration, or DCI (downlink control information).

Example 69 is a method, including the subject matter of examples 65-68, wherein a maximum number of uplink transmission repetitions is restricted to be transmitted within the contiguous uplink transmission time length.

Example 70 is a method, to send, via a non-terrestrial equipment, an uplink transmission request to a base station (BS) and to receive uplink transmission time related information from the BS. The method further comprises to determine a variable contiguous uplink transmission time length based on the received uplink transmission time related information and to transmit uplink within the determined contiguous uplink transmission time length.

Example 71 is a method, including the subject matter of example 70, wherein the uplink transmission time related information includes a service link timing drift rate and a common timing drift rate.

Example 72 is a method to receive, via a non-terrestrial equipment, a downlink transmission from a base station (BS) including an uplink grant and to schedule an enlarged uplink compensation gap. The enlarged uplink compensation gap is greater than a time gap not measuring the UE's location. The method further comprises to measure a location of the UE during the enlarged uplink compensation gap and to transmit an uplink transmission to the BS after the enlarged uplink compensation gap.

Example 73 is a method, including the subject matter of example 72, wherein the downlink transmission includes DCI (downlink control information) N0, and wherein the uplink transmission includes PUSCH format 1.

Example 74 is a method, including the subject matter of example 72, wherein the downlink transmission includes PDSCH, and wherein the uplink transmission includes PUSCH format 2.

Example 75 is a method, including the subject matter of example 72, wherein the method further comprises to report a need of the enlarged uplink compensation gap to the BS when sending an uplink transmission request to the BS prior to the receiving of the downlink transmission from the BS.

Example 76 is a method to receive a downlink control signal from a base station (BS) including a DCI (downlink control information) and to receive a time gap in DCI indicating a first amount of subframes between the last subframe of DCI and NPDSCH and a time offset indicating a second amount of subframes between NPDSCH and a start subframe of an uplink transmission to be scheduled. The method further comprises to determine or receive a timing advance (TA) indicating a third amount of subframes transmitted during a time delay between the UE and the BS via a non-terrestrial equipment and to determine an uplink transmission timing using the time gap, the time offset, and the TA. The method further comprises to transmit, via a non-terrestrial equipment, an uplink using the determined uplink transmission timing.

Example 77 is a method, including the subject matter of example 76, wherein the DCI includes an uplink grant carried by DCI N0, and the uplink transmission includes uplink data carried by NPUSCH format 1; and wherein the NPUSCH format 1 is transmitted after the last subframe of the DCI N0 plus the first amount and the second amount minus the third amount of subframes.

Example 78 is a method, including the subject matter of example 77, wherein the DCI includes a downlink grant carried by DCI N1, and the uplink transmission includes HARQ-ACK/NACK carried by NPUSCH format 2; and wherein the NPUSCH format 2 is transmitted one subframe after the last subframe of the DCI N0 plus the first amount and the second amount minus the third amount of subframes.

Example 79 is a method, to receive, via a non-terrestrial equipment, a downlink control signal from a base station (BS) including a downlink grant and to receive downlink signal in response to the downlink control signal. ACK/NACK (acknowledgement/non-acknowledgement) signaling for the downlink signal is disabled.

Example 80 is a method, including the subject matter of example 79, wherein the downlink control signal indicates a minimum time gap between the last subframe of the downlink signal transmission and the first subframe of a next downlink signal transmission.

Example 81 is a method, including the subject matter of example 79, wherein the downlink control signal indicates a number of repetitions to transmit the downlink signal.

Example 82 is a method, including the subject matter of example 79, wherein the downlink grant is carried by DCI format N1.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An apparatus, comprising:
one or more memories configured to store instructions; and
one or more processors coupled to the one or more memories, and when executing the instructions, configured to:
schedule, for a user equipment (UE) in response to an uplink transmission request, an uplink transmission using one or more subframes ranging from a first uplink subframe to a last uplink subframe;
determine a timing advance (TA) indicating an amount of subframes of a propagation time delay between the UE and a base station (BS), wherein the TA is determined in response to a TA update reported by the UE, the TA update reporting being triggered based on a change in the TA of one subframe or more; and
schedule a downlink transmission, wherein the downlink transmission is refrained from being scheduled concurrently with the uplink transmission for a specified number of subframes, based on the TA, the first uplink subframe, and the last uplink subframe.

2. The apparatus of claim 1, wherein the TA is calculated from a UE location, a serving satellite location, and a BS location, and wherein the UE location is reported to the BS by the UE.

3. The apparatus of claim 1, wherein, when the change of the TA is less than one subframe, the TA is estimated from a previously stored TA and a TA drift rate received from the UE.

4. The apparatus of claim 1, wherein the change is configured for the UE.

5. The apparatus of claim 1, wherein the change is one subframe.

6. The apparatus of claim 1,
wherein the downlink transmission is scheduled to be refrained from subframes ranging from TA plus one or more subframes before the first uplink subframe to TA minus one or more subframes before the last uplink subframe.

7. An apparatus, comprising:
one or more memories configured to store instructions; and
one or more processors coupled to the one or more memories, and when executing the instructions, configured to:
determine a timing advance (TA) related information, the TA related information indicating an amount of subframes of a propagation time delay between a user equipment (UE) and a timing reference point;
determine whether a TA updating criterion is met, the TA updating criterion comprises a change in the TA related information being one subframe or more; and
send the TA related information to a base station (BS) based on the TA updating criterion being satisfied.

8. The apparatus of claim 7, wherein the TA updating criterion comprises the TA related information being more than one subframe.

9. The apparatus of claim 7,
wherein the TA related information further comprises a location of the UE; and
wherein the UE does not update the BS the location of the UE unless the TA updating criterion is met.

10. The apparatus of claim 9, wherein the one or more processors are configured to send a velocity of the UE to the BS when sending the location of the UE.

11. The apparatus of claim 7, wherein the one or more processors are configured to report the TA related information to the BS with a periodicity, wherein the periodicity is configured by the BS and broadcasted via SIB or RRC configuration.

12. The apparatus of claim 11, wherein the one or more processors are further configured to:
sending, via a non-terrestrial equipment, an uplink transmission using one or more subframes ranging from a first uplink subframe to a last uplink subframe,
wherein a downlink transmission is not scheduled using subframes ranging from TA plus one or more subframes ahead of the first uplink subframe to TA minus one or more subframes ahead of the last uplink subframe.

13. The apparatus of claim 7, wherein the one or more processors are configured to report the TA related information to the BS and is not updated by the UE unless responsive to a TA updating request from the BS.

14. A method, comprising:
scheduling, for a user equipment (UE) via a non-terrestrial equipment, an uplink transmission using one or more subframes ranging from a first uplink subframe to a last uplink subframe; and
receive from the UE, a timing advance (TA) update for updating a TA indicating a propagation time delay between the UE and a timing reference point, wherein the TA update is triggered based on a change in the TA of one subframe or more.

15. The method of claim 14, wherein the TA is estimated from a previously stored TA unless the TA update is received.

16. The method of claim 15, wherein the TA update is triggered based on the change in the TA being more than one subframe.

17. The method of claim 14, wherein the TA is determined based on a UE location and a location of the non-terrestrial equipment.

18. The method of claim 14, wherein the timing reference point is a base station.

19. The method of claim 18, wherein a downlink transmission is not scheduled concurrently with the uplink transmission for a specified number of subframes, based on the TA, the first uplink subframe, and the last uplink subframe.

20. The method of claim 18,
wherein a downlink transmission is scheduled to be refrained from subframes ranging from TA plus one or more subframes before the first uplink subframe to TA minus one or more subframes before the last uplink subframe.

\* \* \* \* \*